(12) United States Patent
Eguchi

(10) Patent No.: US 12,164,089 B2
(45) Date of Patent: Dec. 10, 2024

(54) EXTENDER LENS UNIT, ZOOM LENS, AND IMAGE PICKUP APPARATUS

(71) Applicant: CANON KABUSHIKI KAISHA, Tokyo (JP)

(72) Inventor: Yosuke Eguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 461 days.

(21) Appl. No.: 16/985,662

(22) Filed: Aug. 5, 2020

(65) Prior Publication Data

US 2021/0055529 A1 Feb. 25, 2021

(30) Foreign Application Priority Data

Aug. 20, 2019 (JP) ................... 2019-150313

(51) Int. Cl.
*G02B 15/10* (2006.01)
*G02B 3/04* (2006.01)
(Continued)

(52) U.S. Cl.
CPC ............... *G02B 15/10* (2013.01); *G02B 3/04* (2013.01); *G02B 15/145125* (2019.08);
(Continued)

(58) Field of Classification Search
CPC .. G02B 15/10; G02B 15/145125; G02B 3/04; G02B 15/167; G02B 15/17;
(Continued)

(56) References Cited

U.S. PATENT DOCUMENTS 4,340,279 A * 7/1982 Ikemori ................... G02B 9/60
  359/675
5,253,112 A * 10/1993 Suzuki ................... G02B 15/08
  359/675
(Continued)

FOREIGN PATENT DOCUMENTS

JP 2013238827 A 11/2013
JP 5546387 B2 * 7/2014
(Continued)

OTHER PUBLICATIONS

Karl Macher, Television Zoom Lens with Three Integrated Zoom Ranges, SMPTE Journal 808-815 (1982). (Year: 1982).*
(Continued)

*Primary Examiner* — Cara E Rakowski
*Assistant Examiner* — Wesley Scott Ashton
(74) *Attorney, Agent, or Firm* — ROSSI, KIMMS & McDOWELL LLP

(57) ABSTRACT

An extender lens unit to be inserted into and removed from an optical path in a relay lens unit included in a zoom lens consists of a front unit having a positive refractive power, a middle unit having a negative refractive power, and a rear unit having a negative refractive power. The extender lens unit includes three negative lenses. The middle unit includes a negative lens. An average refractive index of positive lenses included in the extender lens unit, an average refractive index of negative lenses included in the extender lens unit, a focal length of the negative lens included in the middle unit, and a focal length of the middle unit are appropriately set.

11 Claims, 17 Drawing Sheets

(51) Int. Cl.
*G02B 15/14* (2006.01)
*G02B 15/167* (2006.01)
*G02B 15/17* (2006.01)
*H04N 23/69* (2023.01)

(52) U.S. Cl.
CPC ........... *G02B 15/167* (2013.01); *G02B 15/17* (2013.01); *H04N 23/69* (2023.01)

(58) Field of Classification Search
CPC ................ G02B 27/0025; G02B 13/02; G02B 15/1461; H04N 5/23296
See application file for complete search history.

(56) References Cited

U.S. PATENT DOCUMENTS

| | | | | |
|---|---|---|---|---|
| 6,104,546 | A * | 8/2000 | Yoshikawa | G02B 15/145125 359/674 |
| 8,873,154 | B2 * | 10/2014 | Takemoto | G02B 15/12 359/672 |
| 9,036,265 | B2 | 5/2015 | Hatada | |
| 9,798,119 | B2 | 10/2017 | Yamada | |
| 10,698,187 | B2 | 6/2020 | Tanaka | |
| 10,732,392 | B2 * | 8/2020 | Aoi | G08B 13/19619 |
| 11,156,810 | B2 * | 10/2021 | Sakuma | G02B 15/144113 |
| 2007/0109665 | A1 * | 5/2007 | Wakazono | G02B 15/17 359/687 |
| 2012/0224269 | A1 * | 9/2012 | Sakamoto | G02B 15/144109 359/674 |
| 2013/0308041 | A1 * | 11/2013 | Hatada | G02B 15/144111 359/557 |
| 2015/0212303 | A1 * | 7/2015 | Ohashi | G02B 27/0062 359/688 |
| 2015/0247996 | A1 * | 9/2015 | Ikeda | G02B 15/173 359/687 |
| 2017/0090164 | A1 * | 3/2017 | Yamada | G02B 15/145125 |
| 2017/0269374 | A1 * | 9/2017 | Takemoto | G02B 27/646 |
| 2018/0259752 | A1 * | 9/2018 | Aoi | G08B 13/19626 |
| 2019/0086645 | A1 * | 3/2019 | Ori | G02B 15/12 |
| 2019/0196157 | A1 * | 6/2019 | Kawamura | G02B 7/04 |
| 2020/0007745 | A1 * | 1/2020 | Tanaka | H04N 23/69 |
| 2020/0018946 | A1 * | 1/2020 | Takemoto | G02B 15/14 |
| 2020/0081232 | A1 * | 3/2020 | Sakuma | G02B 15/10 |

FOREIGN PATENT DOCUMENTS

| | | | | |
|---|---|---|---|---|
| JP | 2016045310 | A | 4/2016 | |
| JP | 2016099396 | A | 5/2016 | |
| JP | 2017068095 | A | 4/2017 | |
| JP | 6393109 | B2 * | 9/2018 | |
| JP | 2019120746 | A * | 7/2019 | G02B 13/02 |
| WO | 2017159325 | A1 | 9/2017 | |

OTHER PUBLICATIONS

K. Macher, New Design Principle for High-Ratio Zoom Lenses, 83 Journal of SMPTE 39-43 (1974). (Year: 1974).*
C. Bond, Lensmaker's Formula, 2017, pp. 1-3 [online], [retrieved Jun. 28, 2023], retrieved from the Internet <URL: https://crbond.com/papers/lensmaker.pdf>. (Year: 2017).*
Machine English Translation of JP 2016-045310 A obtained from Patent Translate (2023) (Year: 2023).*
Lens Materials and Design, 2015, pp. 1-19 [online], [retrieved Feb. 26, 2024], retrieved from the Internet <URL: https://www.nao.org/wp-content/uploads/2020/04/Lens-Material-and-Design.pdf>. (Year: 2015).*
Dan Carr, How to Stack Canon Extenders, 2017, pp. 1-88 [online], [retrieved Apr. 23, 2024], retrieved from the Internet <URL: https://shuttermuse.com/how-to-stack-canon-extenders-teleconverters/>. (Year: 2017).*
Andy Rowlands, Physics of Digital Photography, Chapter 1, 2017, pp. 1-1 to 1-62 [online], [retrieved Nov. 2, 2023], retrieved from the Internet <URL: https://iopscience.iop.org/book/mono/978-0-7503-1242-4/chapter/bk978-0-7503-1242-4ch1.pdf>. (Year: 2017).*
Masashi Yamashita, Design for Telephoto Zoom Lens with Build-in Teleconverter for Digital Still Camera, 11106 Proceedings of SPIE 111060E-1 to 111060E-9 (2019). (Year: 2019).*
Nasim Mansurov, How to Use a Teleconverter, 2020, pp. 1-41 [online], [retrieved Aug. 9, 2024], retrieved from the Internet <URL: https://photographylife.com/what-is-a-teleconverter>. (Year: 2020).*

* cited by examiner

EXTENDER LENS UNIT, ZOOM LENS, AND IMAGE PICKUP APPARATUS

BACKGROUND OF THE INVENTION

Field of the Invention

The present invention relates to an extender lens unit, a zoom lens, and an image pickup apparatus.

Description of the Related Art

For image pickup apparatus, for example, a television camera, there has been demanded a zoom lens having a high zoom ratio and high optical performance. In order to achieve a zoom lens having a high zoom ratio, it is known to incorporate an extender into the zoom lens. In the zoom lens having built therein the extender, an extender lens unit is inserted into or removed from a space secured in a relay lens unit, which is configured not to move for zooming, to thereby shift a focal length range of the zoom lens.

In Japanese Patent Application Laid-Open No. 2017-68095 and International Publication No. WO 2017/159325, there is disclosed a zoom lens, which includes an extender lens unit having a magnification of 2×, and is thus suitable for a broadcasting television camera including a ⅔-inch image pickup element.

In the extender lens unit, a front unit having a positive refractive power converges substantially afocal entering rays, and a rear unit having a negative refractive power converts the rays reduced in height into substantially afocal rays to emit the resultant rays. In this case, the front unit and the rear unit are different in height of the rays. The negative refractive power of the rear unit is thus required to be increased, and hence an absolute value of a negative Petzval sum of the extender lens unit is increased. In this case, a field curvature is increased when the extender lens unit is inserted, and thus performance at a periphery of an image is decreased.

SUMMARY OF THE INVENTION

An aspect of embodiments provides, for example, an extender lens unit beneficial in a compact size, light weight, and high optical performance thereof.

An aspect of embodiments provides an extender lens unit to be inserted into and removed from an optical path in a relay lens unit included in a zoom lens, the extender lens unit consisting of: a front unit having a positive refractive power; a middle unit having a negative refractive power; and a rear unit having a negative refractive power, in which the extender lens unit includes three negative lenses, the middle unit includes a negative lens, and following conditional expressions are satisfied:

$$0.20 < Nn - Np < 0.60; \text{ and}$$

$$0.20 < fbna/fb < 1.00,$$

where Np and Nn represent an average refractive index of positive lenses included in the extender lens unit and an average refractive index of negative lenses included in the extender lens unit, respectively, "fbna" represents a focal length of the negative lens included in the middle unit, and "fb" represents a focal length of the middle unit, in a case where the middle unit includes a plurality of negative lenses, the focal length "fbna" is represented by a following expression:

$$fbna = \frac{1}{\sum_i \frac{1}{fi}}$$

where "fi" represents a focal length of an i-th negative lens of the plurality of negative lenses.

Further features of the present invention will become apparent from the following description of exemplary embodiments with reference to the attached drawings.

DESCRIPTION OF THE EMBODIMENTS

Now, features of a zoom lens according to at least one embodiment of the present invention are described with reference to the attached drawings.

A zoom lens of any one of Embodiments 1 to 7 of the present invention includes, in order from an object side to an image side, a focus portion, a zoom portion including a lens unit configured to move during zooming, an aperture stop for adjusting a light amount, and a relay portion (fifth lens unit) configured not to move for zooming. The relay portion consists of, in order from the object side, a first sub-lens unit, and a third sub-lens unit having a positive refractive power. An extender lens unit (second sub-lens unit) configured to shift a focal length range to a long focal length side is inserted and removed between the first sub-lens unit and the third sub-lens unit.

Figure 1:
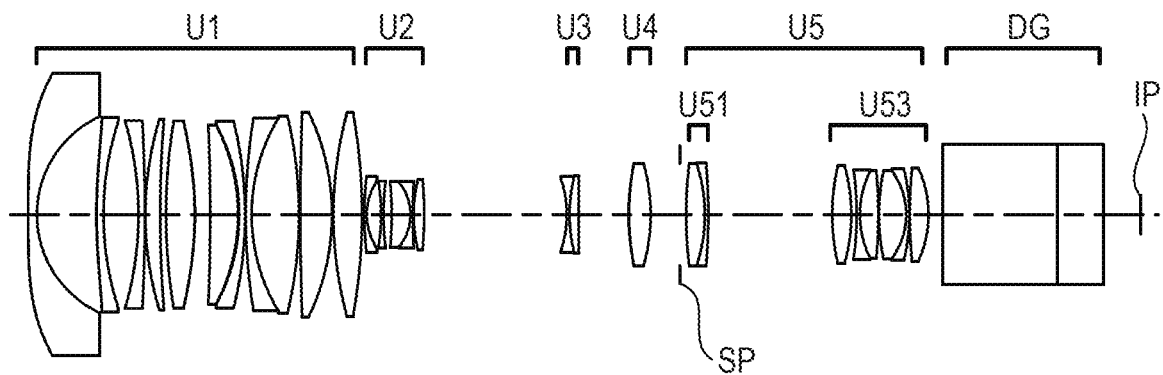
FIG. 1 is a lens cross-sectional view of a zoom lens of any one of Embodiments 1 to 7 of the present invention when focused at an object at infinity at a wide angle end and with an extender lens unit not inserted.

FIG. 1 is a lens cross-sectional view of a zoom lens of any one of Embodiments 1 to 7 of the present invention when focused at an object at infinity at a wide angle end and with an extender inserted.

A first lens unit U1 having a positive refractive power is configured not to move for zooming. A lens unit included as a part of the first lens unit U1 is configured to move during focusing from an object at infinity to an object at close distance. A second lens unit U2 having a negative refractive power for zooming is configured to move toward the image side during zooming from the wide angle end (short focal length end) to a telephoto end (long focal length end). A third lens unit U3 having a negative refractive power for zooming is configured to move on an optical axis during zooming from the wide angle end to the telephoto end. A fourth lens unit U4 having a positive refractive power is configured to correct an image plane variation accompanying zooming. A relay lens unit U5 having a positive refractive power includes an aperture stop SP configured not to move during zooming, and is configured not to move during zooming. The relay lens unit U5 can be divided into two units of a first sub-lens unit U51 and a third sub-lens unit U53. A second sub-lens unit U52 can be freely inserted into and removed from an optical path between the first sub-lens unit U51 and the third sub-lens unit U53. The first sub-lens unit U51, the second sub-lens unit U52, and the third sub-lens unit U53 are lens units configured not to move for zooming. An image plane IP corresponds to an image pickup surface of a solid-state image pickup element (photoelectric transducer).

Next, a lens configuration of each unit with the extender lens unit inserted in any one of Embodiments 1 to 7 is described. In the following, the lenses are arranged in order from the object side to the image side.

The first lens unit U1 consists of eleven lenses of a negative lens, a negative lens, a negative lens, a positive lens, a positive lens, a positive lens, a negative lens, a cemented lens of a negative lens and a positive lens, a positive lens, and a positive lens. During focusing, the fifth lens of the first lens unit from the object side moves toward the image side when focusing on an object at close distance. The second lens unit U2 consists of a negative lens, a negative lens, a cemented lens of a positive lens and a negative lens, and a positive lens. The third lens unit U3 consists of a cemented lens of a negative lens and a positive lens. The fourth lens unit U4 consists of a positive lens. During zooming, the second lens unit, the third lens unit, and the fourth lens unit move. The fifth lens unit U5 consists of an aperture stop, a cemented lens of a positive lens and a negative lens, a positive lens, a cemented lens of a negative lens and a positive lens, a cemented lens of a positive lens and a negative lens, and a positive lens.

In order to obtain an extender having high performance while maintaining the entire length of the extender, it is required to achieve both of correction of a spherical aberration and a chromatic aberration and correction of a Petzval sum. When the extender only includes two or less negative lens components, there is a limit to the performance of the correction of the Petzval sum while performing correction of an axial chromatic aberration and a chromatic aberration of magnification. The extender therefore requires three or more negative lens components. At this time, it is suitable to correct the axial chromatic aberration mainly by a front unit U521 arranged on the object side having the highest axial ray, and correct the chromatic aberration of magnification by a middle unit U522 and a rear unit U523 having a high off-axial ray. Thus, in order to effectively correct the aberrations, it is required to obtain a configuration in which the axial chromatic aberration is corrected by the front unit U521, while the Petzval sum and the chromatic aberration of magnification are corrected by the middle unit U522 and the rear unit U523.

In order to effectively correct the Petzval sum, it is required to increase refractive indices of the negative lenses included in the extender lens unit, and it is also required to appropriately set a combined refractive power of the negative lens of the middle unit U522 with respect to the negative refractive power of the middle unit U522. When the entire middle unit U522 has a strong positive refractive power, the refractive power of the rear unit U523 is increased, and when the entire middle unit U522 has a strong negative refractive power, the refractive power of the rear unit U523 is increased. Thus, it becomes difficult to correct the aberrations.

The zoom lens with the built-in extender according to at least one embodiment of the present invention includes, in order from the object side to the image side, a zoom unit configured to move for zooming, and an aperture stop and a relay lens unit, which are configured not to move for zooming. The zoom lens further includes an extender lens unit configured to change a focal length range of the zoom lens by being inserted into and removed from an optical path of the relay lens unit. The extender lens unit consists of, in order from the object side to the image side, the positive front unit U521, the negative middle unit U522, and the negative rear unit U523, and the extender lens unit includes at least three negative lenses. The negative middle unit U522 includes at least one negative lens. The negative rear unit U523 includes one negative lens. Further, the following conditional expressions are satisfied:

$$0.20 < Nn - Np < 0.60 \quad (1); \text{ and}$$

$$0.20 < fbna/fb < 1.0 \quad (2),$$

where Np and Nn represent an average refractive index of positive lenses included in the extender lens unit and an average refractive index of negative lenses included in the extender lens unit, respectively, "fb" represents a focal length of the middle unit U522, and "fbna" represents a combined focal length of the negative lens included in the middle unit U522. In this case, when the middle unit U522 includes a plurality of negative lenses, "fbna" is represented by the following expression:

$$fbna = \frac{1}{\sum_i \frac{1}{fi}}$$

where "fi" represents a focal length of an i-th negative lens.

The conditional expression (1) defines a difference between the average refractive index Nn of the negative lenses in the extender lens unit U52 and the average refractive index Np of the positive lenses in the extender lens unit U52. When the conditional expression (1) is satisfied, it is possible to suppress the Petzval sum, which is required for achieving high performance, and high optical performance can be achieved in the entire screen range. When the conditional expression (1) is not satisfied, the Petzval sum deteriorates, and the performance at the screen periphery deteriorates.

The conditional expression (2) defines a ratio of the combined focal length "fbna" of the negative lens included in the middle unit U522 of the extender lens unit U52 to the focal length "fb" of the middle unit U522. When the conditional expression (2) is satisfied, the combined refractive power of the negative lens included in the middle unit U522 becomes appropriate with respect to the refractive power of the entire middle unit U522, and the refractive power is appropriately shared with the negative rear unit U523. Thus, it is possible to satisfactorily correct the Petzval sum and the chromatic aberration of magnification. When the ratio of the conditional expression (2) falls below the lower limit of the conditional expression (2), the negative refractive power of the middle unit U522 becomes too weak, and hence the negative refractive power of the rear unit U523 becomes stronger. Thus, it becomes difficult to correct the aberrations. When the ratio of the conditional expression (2) exceeds the upper limit of the conditional expression (2), the refractive power of the middle unit U522 becomes too strong, and hence the negative refractive power of the rear unit U523 becomes weaker. Thus, it becomes difficult to correct particularly the chromatic aberration of magnification.

It is preferred to set the conditional expression (1) and the conditional expression (2) as follows.

$$0.21 < Nn - Np < 0.50 \quad (1a)$$

$$0.21 < fbna/fb < 0.90 \quad (2a)$$

It is more preferred to set the conditional expression (1) and the conditional expression (2) as follows.

$$0.22 < Nn - Np < 0.40 \quad (1b)$$

$$0.22 < fbna/fb < 0.80 \quad (2b)$$

Further, in the zoom lens with the built-in extender according to at least one embodiment of the present invention, it is preferred to satisfy one or more of the following conditional expressions (3) to (6).

$$0.40 < fb/fc < 8.00 \quad (3)$$

$$-2.50 < fa/fbc < -1.50 \quad (4)$$

$$10.0 < vdp - vdn < 40.0 \quad (5)$$

$$0.50 < TDext/fa < 1.50 \quad (6)$$

In the expressions, "fa" and "fc" represent the focal length of the front unit U521 in the extender lens unit and the focal length of the rear unit U523 in the extender lens unit, respectively, and "fbc" represents a combined focal length of the middle unit U522 and the rear unit U523. Further, "vdp" and "vdn" represent an average Abbe number of the positive lenses included in the extender lens unit and an average Abbe number of the negative lenses included in the extender lens unit, respectively. Further, TDext represents a distance on the optical axis from a surface of the extender lens unit closest to the object side to a surface of the extender lens unit closest to the image side.

The conditional expression (3) defines a ratio of the focal length of the negative middle unit U522 in the extender lens unit to the focal length of the negative rear unit U523 in the extender lens unit. When the conditional expression (3) is satisfied, the correction of the Petzval sum and the chromatic aberration of magnification can be appropriately performed. When the ratio of the conditional expression (3) falls below the lower limit of the conditional expression (3), the focal length of the rear unit U523 becomes too large, and the correction of the chromatic aberration of magnification becomes disadvantageously insufficient. When the ratio of the conditional expression (3) exceeds the upper limit of the conditional expression (3), the focal length of the middle unit U522 becomes too large, and the correction of the Petzval sum becomes disadvantageously insufficient.

The conditional expression (4) defines a ratio of the focal length of the front unit U521 in the extender lens unit to a focal length calculated assuming that the middle unit U522 and the rear unit U523 are integrated. When the conditional expression (4) is satisfied, both of the correction of the spherical aberration and the correction of the Petzval sum and the chromatic aberration of magnification can be achieved. When the ratio of the conditional expression (4) falls below the lower limit of the conditional expression (4), the focal length of the front unit U521 becomes too large. In order to obtain an appropriate extender magnification, the entire length of the extender lens unit is required to be increased, and thus the downsizing becomes disadvantageously difficult. When the ratio of the conditional expression (4) exceeds the upper limit of the conditional expression (4), the focal length of the front unit U521 becomes too small, and it becomes disadvantageously difficult to correct particularly the spherical aberration.

The conditional expression (5) defines a difference between the average Abbe number of the positive lenses included in the extender lens unit and the average Abbe number of the negative lenses included in the extender lens unit. When the conditional expression (5) is satisfied, the chromatic aberration can be appropriately corrected in the extender lens unit, and higher performance can be achieved. When the difference of the conditional expression (5) falls below the lower limit of the conditional expression (5), the difference between the Abbe number of the positive lenses and the Abbe number of the negative lenses becomes too small, and the zoom lens is disadvantageously unable to correct the chromatic aberration appropriately. When the difference of the conditional expression (5) exceeds the upper limit of the conditional expression (5), the difference between the Abbe number of the positive lenses and the Abbe number of the negative lenses becomes too large, and the focal length of each lens becomes too large for achromatization. In this case, it becomes disadvantageously difficult to correct the Petzval sum and ensure the extender magnification.

The conditional expression (6) defines a ratio of the thickness of the extender lens unit to the focal length of the front unit U521. When the conditional expression (6) is satisfied, both of an appropriate extender magnification and downsizing can be achieved. When the ratio of the conditional expression (6) falls below the lower limit of the conditional expression (6), the focal length of the front unit U521 becomes too small. In this case, it becomes disadvantageously difficult to ensure an appropriate extender magnification. When the ratio of the conditional expression (6) exceeds the upper limit of the conditional expression (6), the thickness of the extender lens unit becomes too large. In this case, it becomes disadvantageously difficult to achieve downsizing.

It is preferred to set the conditional expression (3) to the conditional expression (6) as follows.

$$0.50 < fb/fc < 6.00 \tag{3a}$$

$$-2.40 < fa/fbc < -1.70 \tag{4a}$$

$$12.0 < vdp - vdn < 35.0 \tag{5a}$$

$$0.60 < TDext/fa < 1.40 \tag{6a}$$

It is more preferred to set the conditional expression (3) to the conditional expression (6) as follows.

$$0.60 < fb/fc < 4.00 \tag{3b}$$

$$-2.30 < fa/fbc < -2.00 \tag{4b}$$

$$15.0 < vdp - vdn < 30.0 \tag{5b}$$

$$0.70 < TDext/fa < 1.20 \tag{6b}$$

The extender lens unit is preferred to have a configuration including seven or more lenses. When the extender lens unit has a configuration including seven or more lenses, the aberration correction can be shared by the front unit U521, the middle unit U522, and the rear unit U523, and satisfactory optical performance can be obtained at the time of insertion of the extender lens unit.

The extender lens unit is preferred to include two or more cemented lenses. When the extender lens unit includes two or more cemented lenses, both of the axial chromatic aberration and the chromatic aberration of magnification can be satisfactorily corrected.

The extender lens unit is preferred to have a configuration including eight or less lenses. When the extender lens unit has a configuration including eight or less lenses, the entire thickness of the extender lens unit can be suppressed, and an increase in size of the lens can be suppressed.

The extender lens unit is preferred to have three or more cemented surfaces. When the extender lens unit has three or more cemented surfaces, rays can pass even at a strong curvature causing total reflection at an air interface, and a refractive power of a cemented surface serving as a chromatic aberration correction surface can be increased. Thus, it is possible to satisfactorily correct the chromatic aberration.

The zoom lens according to at least one embodiment of the present invention includes, in order from the object side, a first lens unit having a positive refractive power, which is configured not to move for zooming, a second lens unit having a negative refractive power, which is configured to move for zooming, and a third lens unit configured to move for zooming. When the zoom lens has such a configuration, suppression of the Petzval sum and the chromatic aberration of magnification tends to become difficult. Thus, the correction of the Petzval sum and the chromatic aberration of magnification in at least one embodiment of the present invention becomes particularly effective.

Figure 2A:
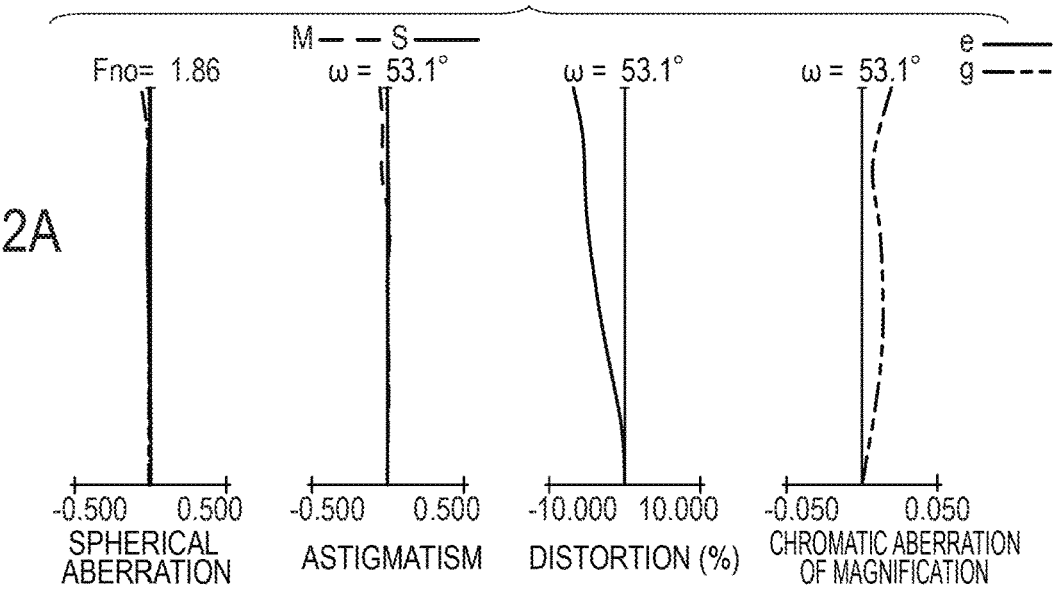
FIG. 2A shows diagrams of various aberrations in any one of Embodiments 1 to 7 at the wide angle end when focused at an object at infinity and with the extender lens unit inserted.
Figure 2B:
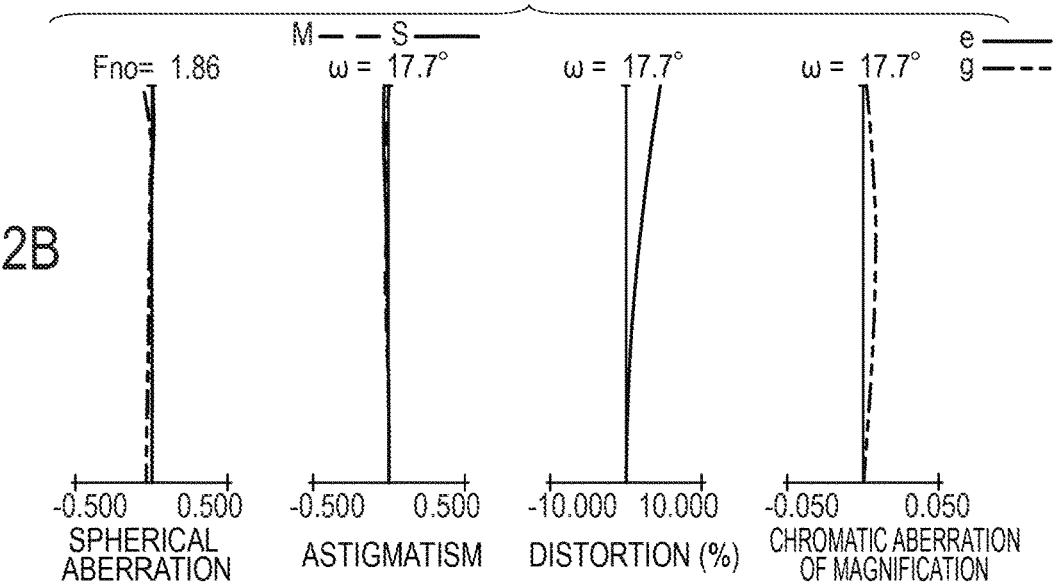
FIG. 2B shows diagrams of various aberrations in any one of Embodiments 1 to 7 at an intermediate focal length when focused at an object at infinity and with the extender lens unit inserted.
Figure 2C:
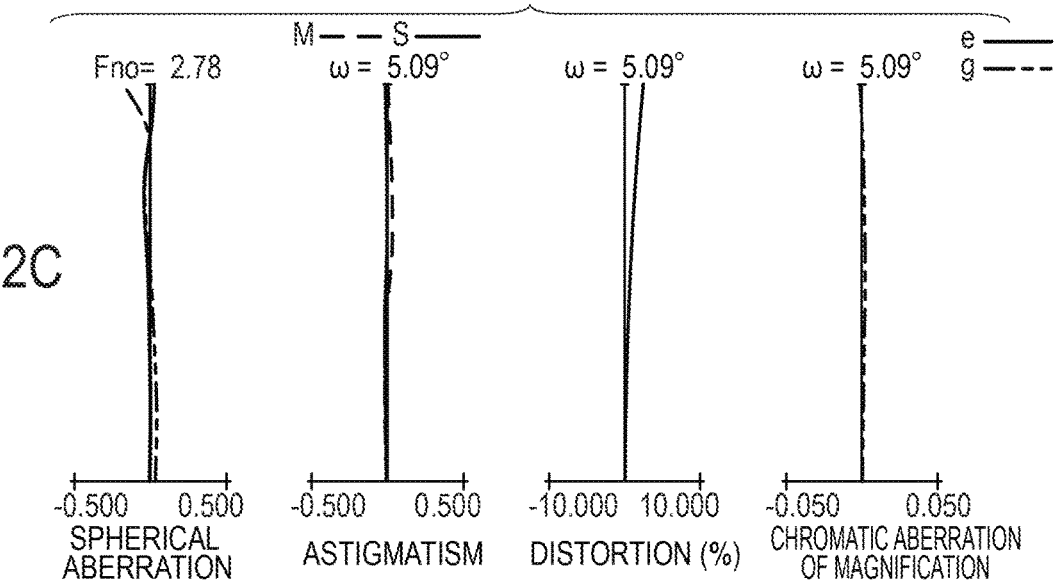
FIG. 2C shows diagrams of various aberrations in any one of Embodiments 1 to 7 at a telephoto end when focused at an object at infinity and with the extender lens unit inserted.

FIG. 2A, FIG. 2B, and FIG. 2C show diagrams of various aberrations in Embodiment 1 at a wide angle end, an intermediate focal length, and a telephoto end, respectively, when focus is at an object at infinity and the extender lens unit is retracted. The value of the focal length is a value obtained when Numerical Embodiment, which is to be described later, is expressed in units of mm.

Embodiment 1

Figure 3:
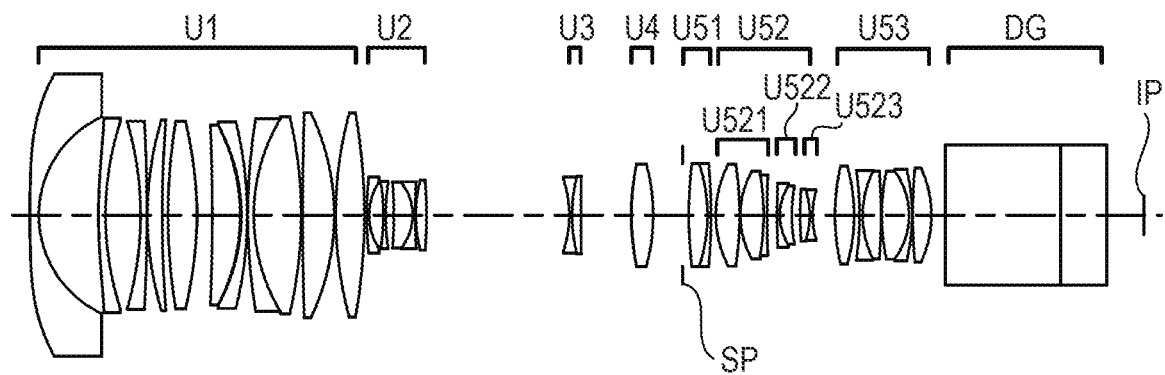
FIG. 3 is a lens cross-sectional view of a zoom lens of Embodiment 1 of the present invention when focused at an object at infinity at a wide angle end and with an extender lens unit inserted.

FIG. 3 is a lens cross-sectional view of the zoom lens of Embodiment 1 when focus is at an object at infinity at the wide angle end and the extender lens unit is inserted. The extender lens unit U52 of Embodiment 1 can be divided into the positive front unit U521, the negative middle unit U522, and the negative rear unit U523. The front unit U521 consists of a positive lens, and a cemented lens of a positive lens and a negative lens. The middle unit U522 consists of a cemented lens of a negative lens and a positive lens. The rear unit U523 consists of a cemented lens of a positive lens and a negative lens.

Figure 4A:
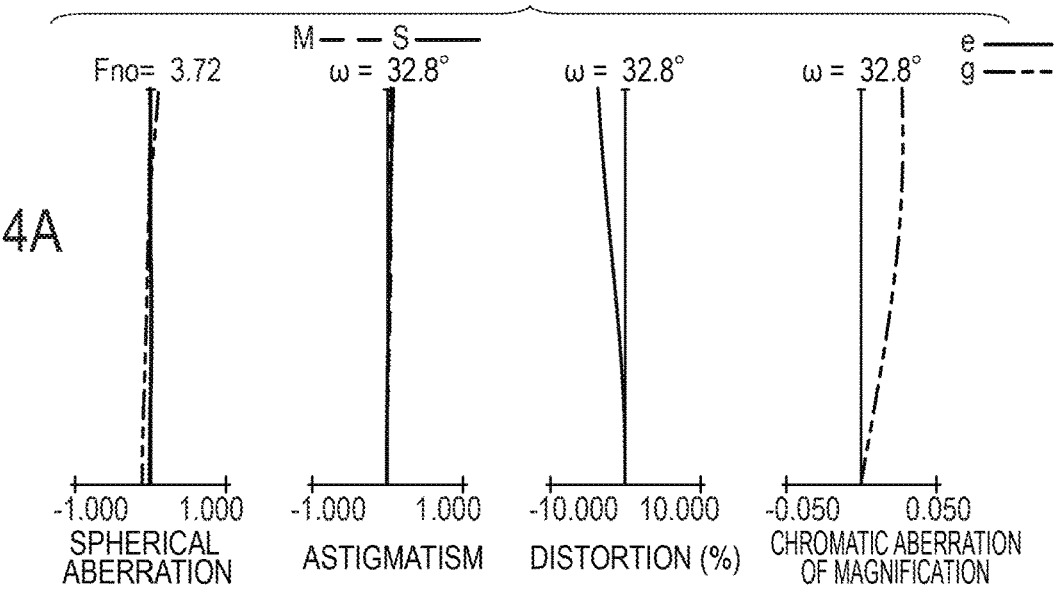
FIG. 4A shows diagrams of various aberrations in Embodiment 1 at the wide angle end when focused at an object at infinity and with the extender lens unit inserted.
Figure 4B:
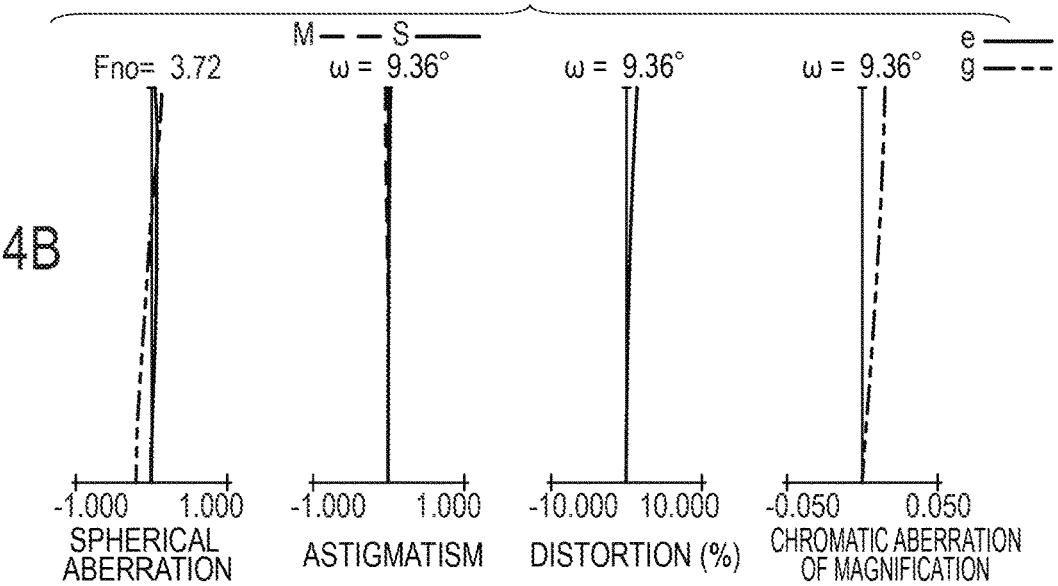
FIG. 4B shows diagrams of various aberrations in Embodiment 1 at an intermediate focal length when focused at an object at infinity and with the extender lens unit inserted.
Figure 4C:
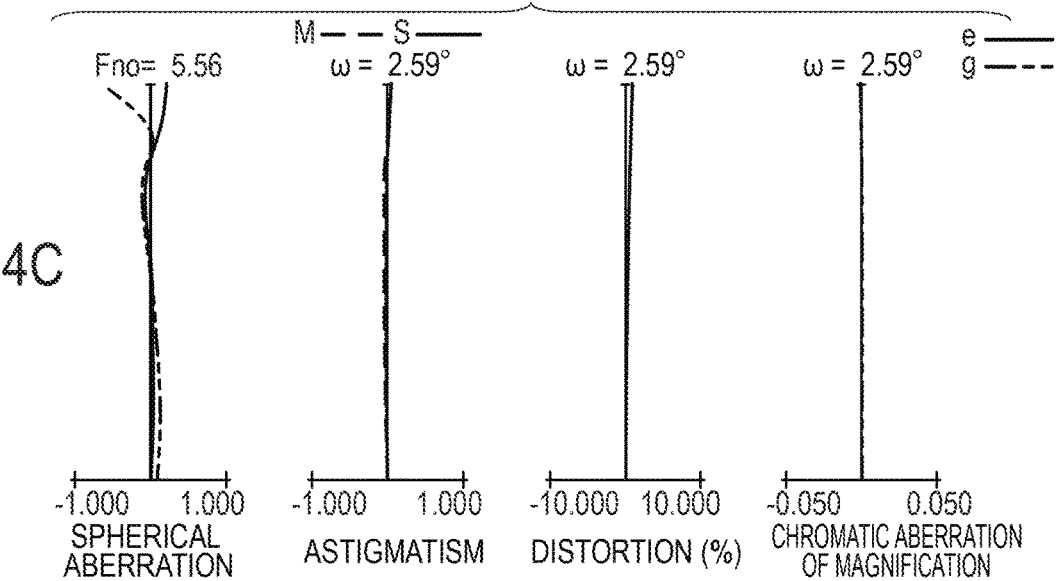
FIG. 4C shows diagrams of various aberrations in Embodiment 1 at a telephoto end when focused at an object at infinity and with the extender lens unit inserted.

FIG. 4A, FIG. 4B, and FIG. 4C are longitudinal aberration diagrams of Embodiment 1 at the wide angle end, the intermediate focal length, and the telephoto end, respectively, when focus is at an object at infinity and the extender lens unit is inserted into the optical path. In the aberration diagrams obtained when the extender lens unit is retracted, the spherical aberration, the astigmatism, the distortion, and the chromatic aberration of magnification are drawn on scales of 0.5 mm, 0.5 mm, 10%, and 0.05 mm, respectively. In the aberration diagrams obtained when the extender lens unit is inserted, the spherical aberration, the astigmatism, the distortion, and the chromatic aberration of magnification are drawn on scales of 1.00 mm, 1.00 mm, 10%, and 0.05 mm, respectively. Symbol Fno represents an f-number, and symbol "ω" represents a half angle of view. This applies to each of the following Embodiments. The wide angle end and the telephoto end refer to zoom positions at the time when the second lens unit U2 for zooming is located at both ends of the range in which the second lens unit U2 is mechanically movable on the optical axis. This also applies to each of the following Embodiments.

As is understood from the aberration diagrams, the aberrations are satisfactorily corrected. Correspondence to the conditional expressions (1) to (6) in Numerical Embodiment 1, which corresponds to Embodiment 1 and is to be described later, is shown in Table 1. Numerical Embodiment 1 satisfies the conditional expressions (1) to (6).

As described above, with the configuration of Embodiment 1, both of the correction of the Petzval sum and the correction of the chromatic aberration of magnification can be achieved.

Embodiment 2

Figure 5:
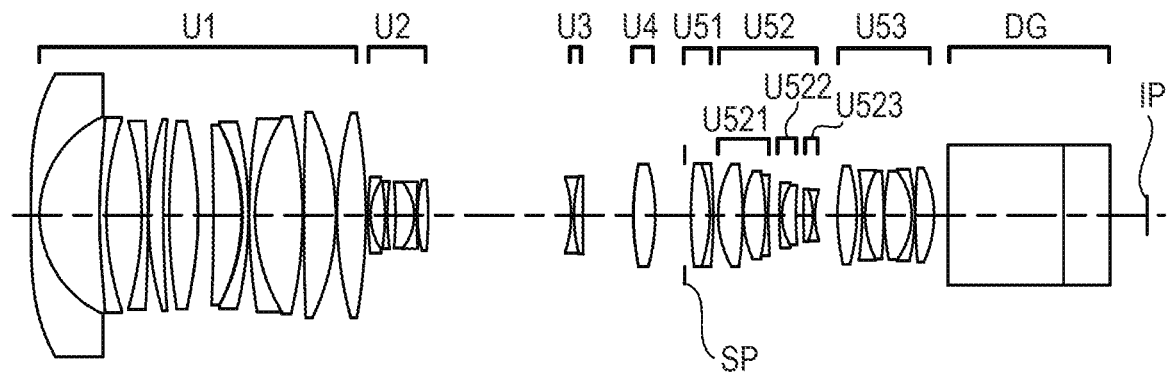
FIG. 5 is a lens cross-sectional view of a zoom lens of Embodiment 2 of the present invention when focused at an object at infinity at a wide angle end and with an extender lens unit inserted.

FIG. 5 is a lens cross-sectional view of the zoom lens of Embodiment 2 when focus is at an object at infinity at the wide angle end and the extender lens unit is inserted. The extender lens unit U52 of Embodiment 2 has a configuration similar to that of Embodiment 1. That is, the extender lens unit U52 can be divided into the positive front unit U521, the negative middle unit U522, and the negative rear unit U523. The front unit U521 consists of a positive lens, and a cemented lens of a positive lens and a negative lens. The middle unit U522 consists of a cemented lens of a negative lens and a positive lens. The rear unit U523 consists of a cemented lens of a positive lens and a negative lens.

Figure 6A:
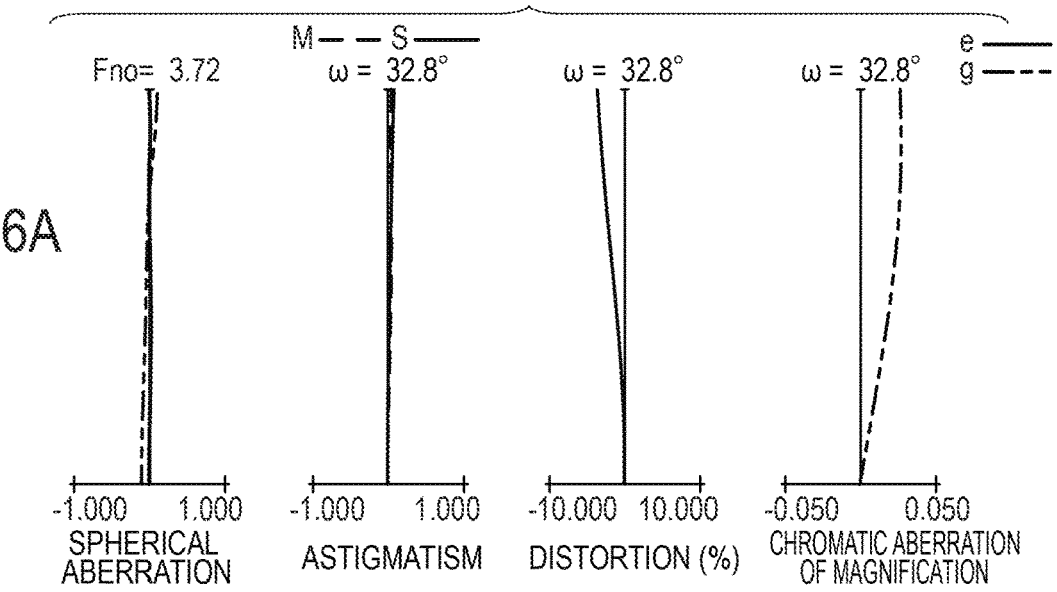
FIG. 6A shows diagrams of various aberrations in Embodiment 2 at the wide angle end when focused at an object at infinity and with the extender lens unit inserted.
Figure 6B:
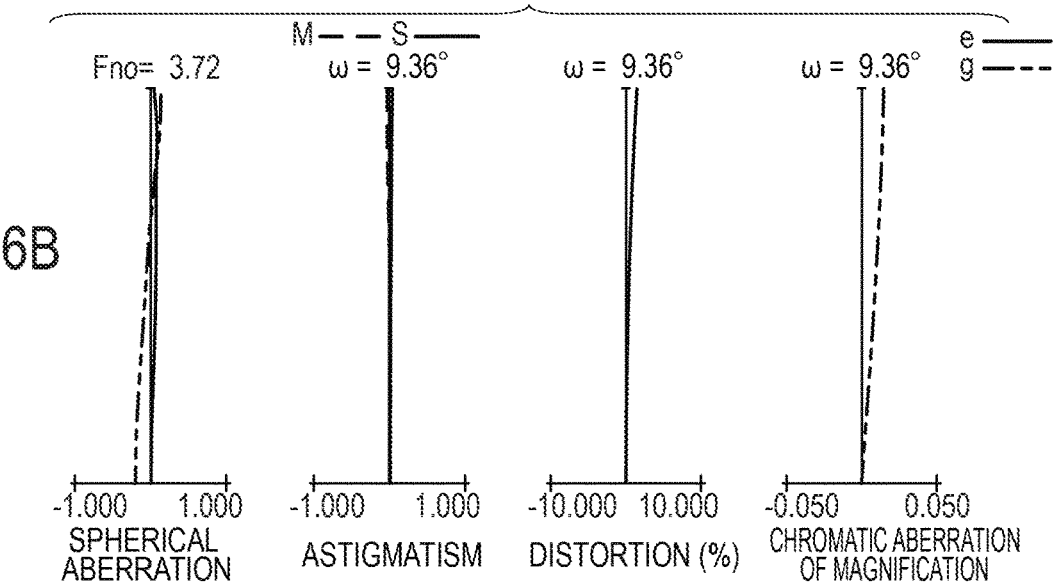
FIG. 6B shows diagrams of various aberrations in Embodiment 2 at an intermediate focal length when focused at an object at infinity and with the extender lens unit inserted.
Figure 6C:
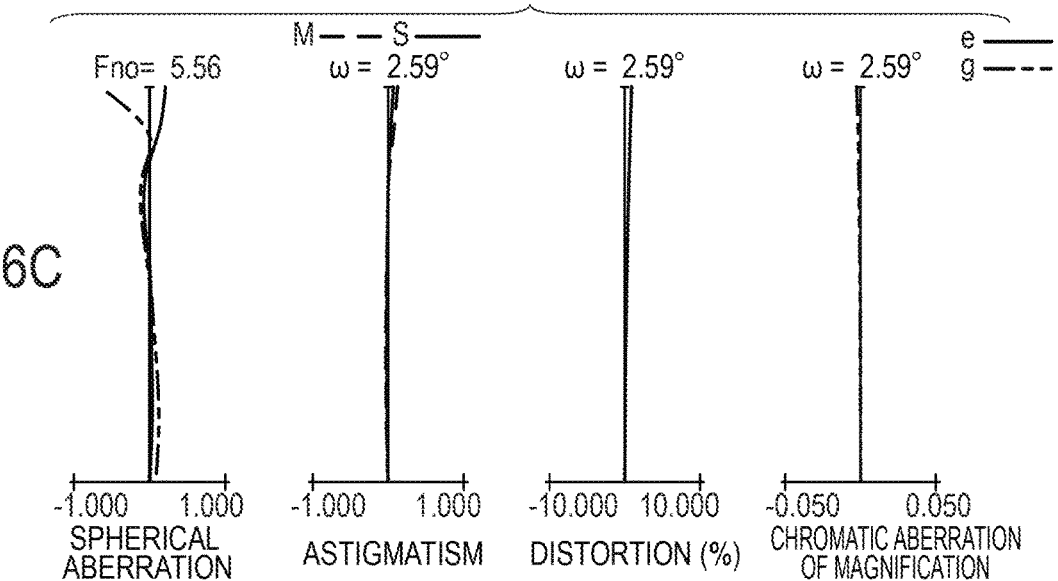
FIG. 6C shows diagrams of various aberrations in Embodiment 2 at a telephoto end when focused at an object at infinity and with the extender lens unit inserted.

FIG. 6A, FIG. 6B, and FIG. 6C are longitudinal aberration diagrams of Embodiment 2 at the wide angle end, the intermediate focal length, and the telephoto end, respectively, when focus is at an object at infinity and the extender lens unit is inserted into the optical path. As is understood from the aberration diagrams, the aberrations are satisfactorily corrected. Correspondence to the conditional expressions (1) to (6) in Numerical Embodiment 2, which corresponds to Embodiment 2 and is to be described later, is shown in Table 1. Numerical Embodiment 2 satisfies the conditional expressions (1) to (6).

As described above, with the configuration of Embodiment 2, both of the correction of the Petzval sum and the correction of the chromatic aberration of magnification can be achieved.

Embodiment 3

Figure 7:
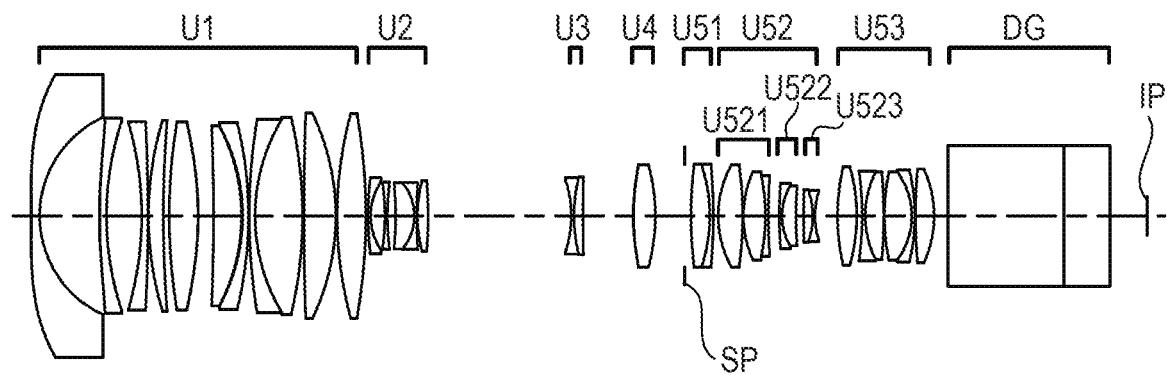
FIG. 7 is a lens cross-sectional view of a zoom lens of Embodiment 3 of the present invention when focused at an object at infinity at a wide angle end and with an extender lens unit inserted.

FIG. 7 is a lens cross-sectional view of the zoom lens of Embodiment 3 when focus is at an object at infinity at the wide angle end and the extender lens unit is inserted. The extender lens unit U52 of Embodiment 3 has a configuration similar to that of Embodiment 1.

That is, the extender lens unit U52 can be divided into the positive front unit U521, the negative middle unit U522, and the negative rear unit U523. The front unit U521 consists of a positive lens, and a cemented lens of a positive lens and a negative lens. The middle unit U522 consists of a cemented lens of a negative lens and a positive lens. The rear unit U523 consists of a cemented lens of a positive lens and a negative lens.

Figure 8A:
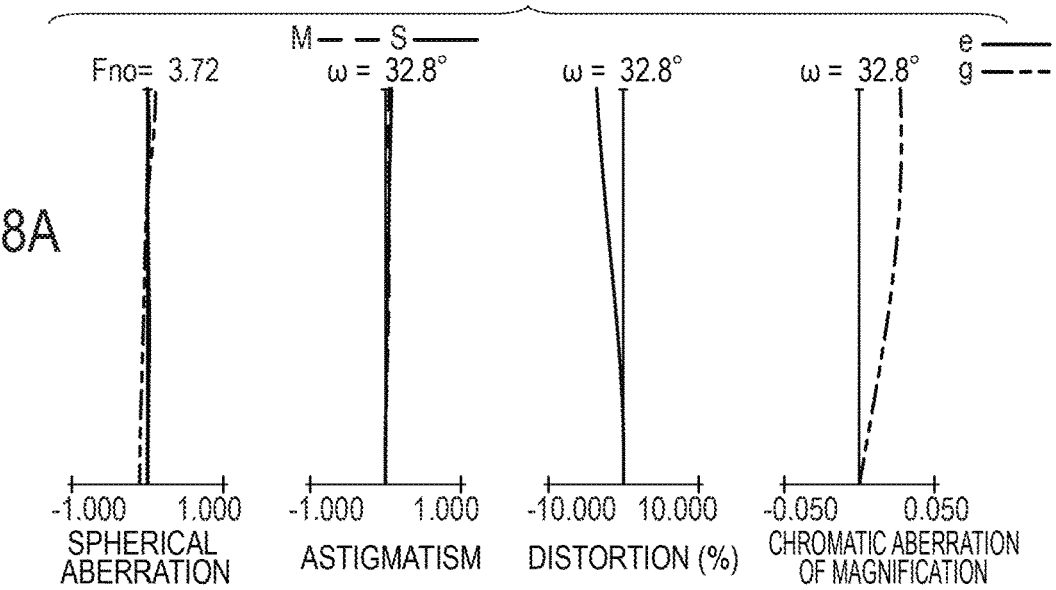
FIG. 8A shows diagrams of various aberrations in Embodiment 3 at the wide angle end when focused at an object at infinity and with the extender lens unit inserted.
Figure 8B:
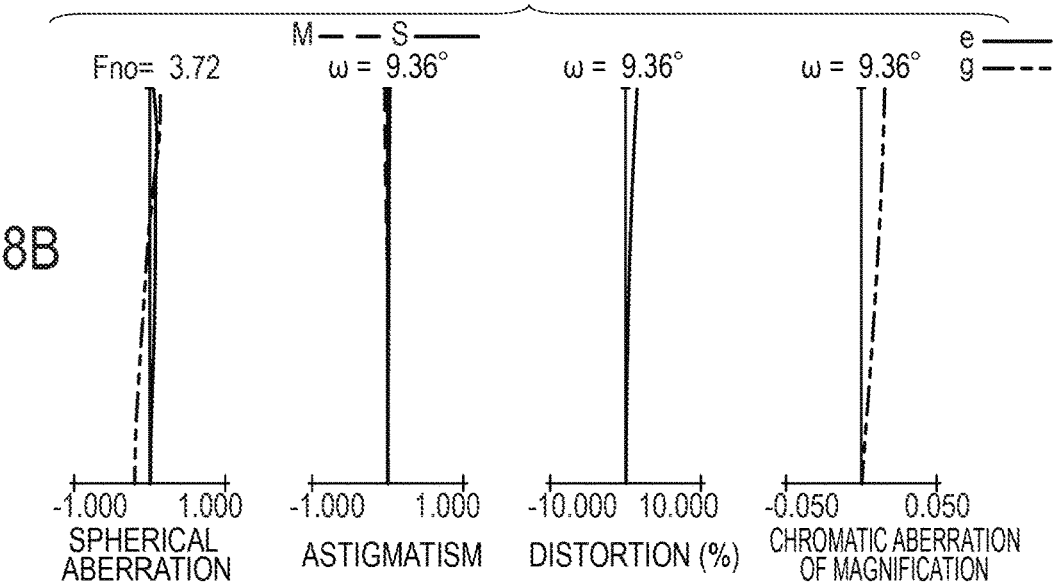
FIG. 8B shows diagrams of various aberrations in Embodiment 3 at an intermediate focal length when focused at an object at infinity and with the extender lens unit inserted.
Figure 8C:
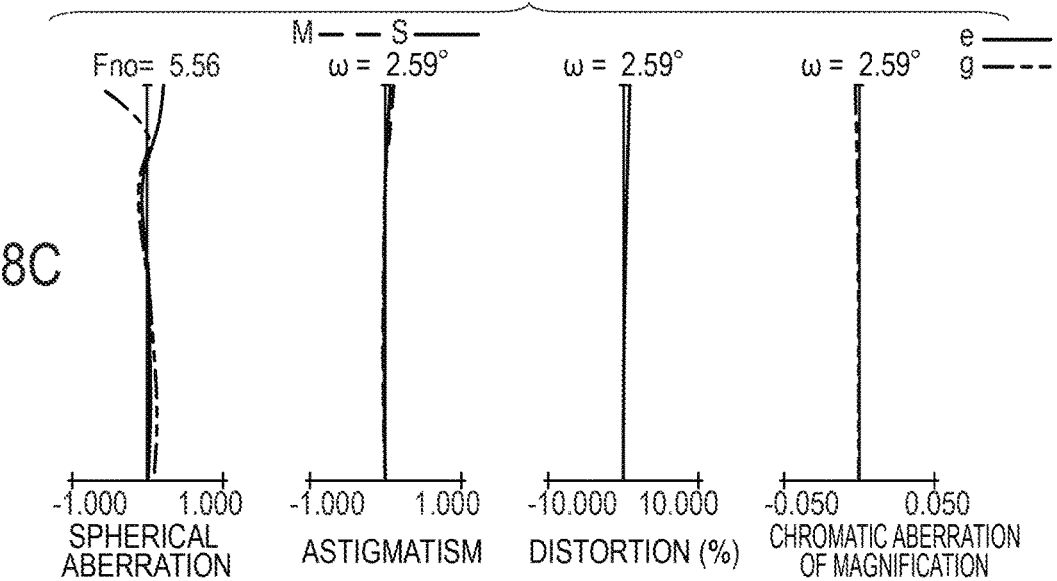
FIG. 8C shows diagrams of various aberrations in Embodiment 3 at a telephoto end when focused at an object at infinity and with the extender lens unit inserted.

FIG. 8A, FIG. 8B, and FIG. 8C are longitudinal aberration diagrams of Embodiment 3 at the wide angle end, the intermediate focal length, and the telephoto end, respectively, when focus is at an object at infinity and the extender lens unit is inserted into the optical path. As is understood from the aberration diagrams, the aberrations are satisfactorily corrected. Correspondence to the conditional expressions (1) to (6) in Numerical Embodiment 3, which corresponds to Embodiment 3 and is to be described later, is shown in Table 1. Numerical Embodiment 3 satisfies the conditional expressions (1) to (6).

As described above, with the configuration of Embodiment 3, both of the correction of the Petzval sum and the correction of the chromatic aberration of magnification can be achieved.

Embodiment 4

Figure 9:
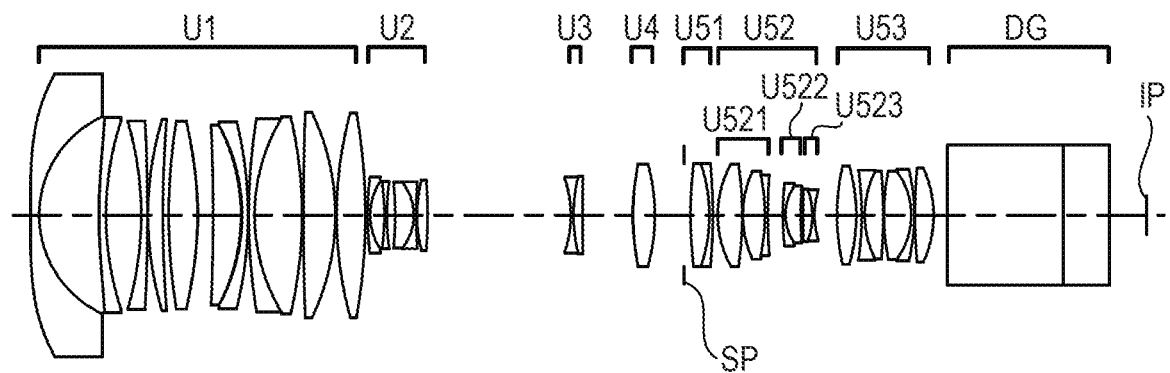
FIG. 9 is a lens cross-sectional view of a zoom lens of Embodiment 4 of the present invention when focused at an object at infinity at a wide angle end and with an extender lens unit inserted.

FIG. 9 is a lens cross-sectional view of the zoom lens of Embodiment 4 when focus is at an object at infinity at the wide angle end and the extender lens unit is inserted. The extender lens unit U52 of Embodiment 4 has a configuration similar to that of Embodiment 1.

That is, the extender lens unit U52 can be divided into the positive front unit U521, the negative middle unit U522, and the negative rear unit U523. The front unit U521 consists of a positive lens, and a cemented lens of a positive lens and a negative lens. The middle unit U522 consists of a cemented lens of a negative lens and a positive lens. The rear unit U523 consists of a cemented lens of a positive lens and a negative lens.

Figure 10A:
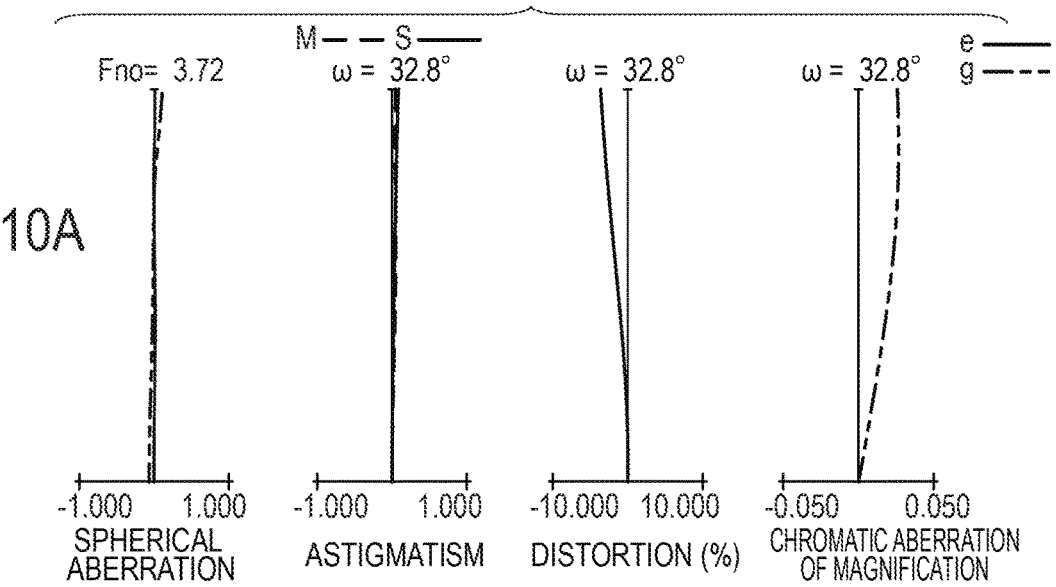
FIG. 10A shows diagrams of various aberrations in Embodiment 4 at the wide angle end when focused at an object at infinity and with the extender lens unit inserted.
Figure 10B:
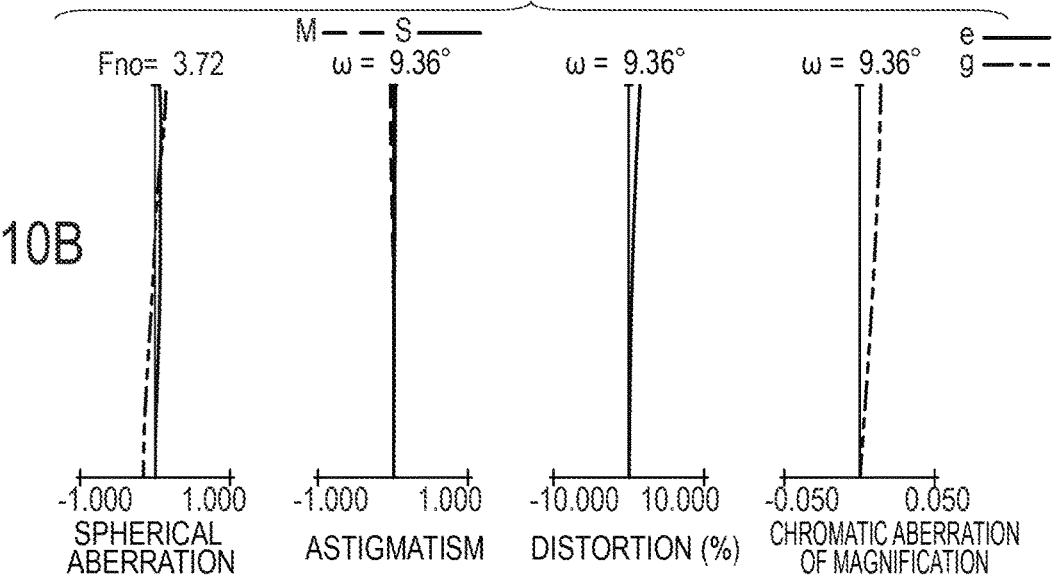
FIG. 10B shows diagrams of various aberrations in Embodiment 4 at an intermediate focal length when focused at an object at infinity and with the extender lens unit inserted.
Figure 10C:
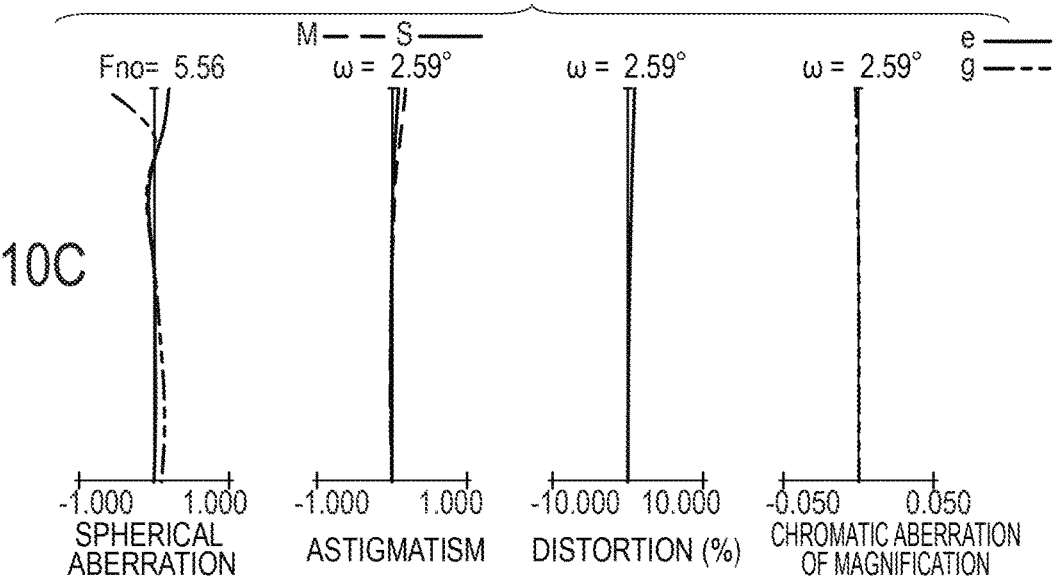
FIG. 10C shows diagrams of various aberrations in Embodiment 4 at a telephoto end when focused at an object at infinity and with the extender lens unit inserted.

FIG. 10A, FIG. 10B, and FIG. 10C are longitudinal aberration diagrams of Embodiment 4 at the wide angle end, the intermediate focal length, and the telephoto end, respectively, when focus is at an object at infinity and the extender lens unit is inserted into the optical path. As is understood from the aberration diagrams, the aberrations are satisfactorily corrected. Correspondence to the conditional expressions (1) to (6) in Numerical Embodiment 4, which corresponds to Embodiment 4 and is to be described later, is shown in Table 1. Numerical Embodiment 4 satisfies the conditional expressions (1) to (6).

As described above, with the configuration of Embodiment 4, both of the correction of the Petzval sum and the correction of the chromatic aberration of magnification can be achieved.

Embodiment 5

Figure 11:
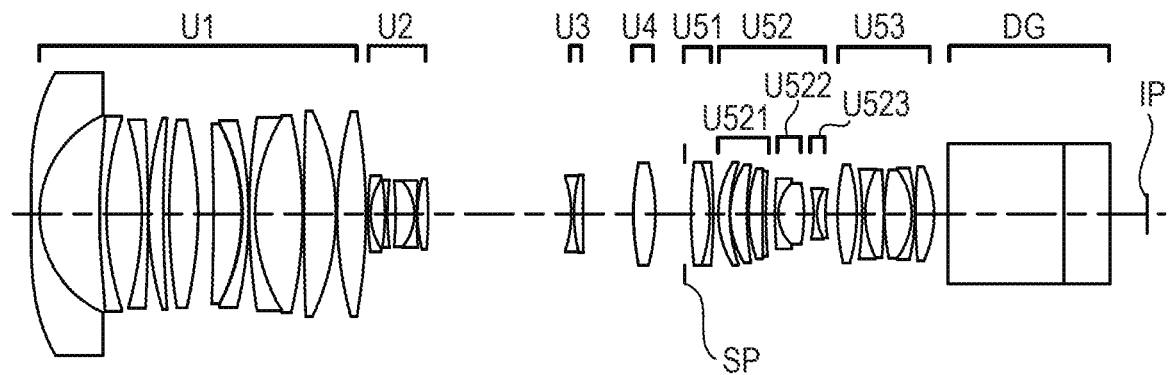
FIG. 11 is a lens cross-sectional view of a zoom lens of Embodiment 5 of the present invention when focused at an object at infinity at a wide angle end and with an extender lens unit inserted.

FIG. 11 is a lens cross-sectional view of the zoom lens of Embodiment 5 when focus is at an object at infinity at the wide angle end and the extender lens unit is inserted. The extender lens unit U52 of Embodiment 5 can be divided into the positive front unit U521, the negative middle unit U522, and the negative rear unit U523. The front unit U521 consists of a positive lens, a positive lens, and a cemented lens of a positive lens and a negative lens. The middle unit U522 consists of a cemented lens of a negative lens and a positive lens. The rear unit U523 consists of a cemented lens of a positive lens and a negative lens.

Figure 12A:
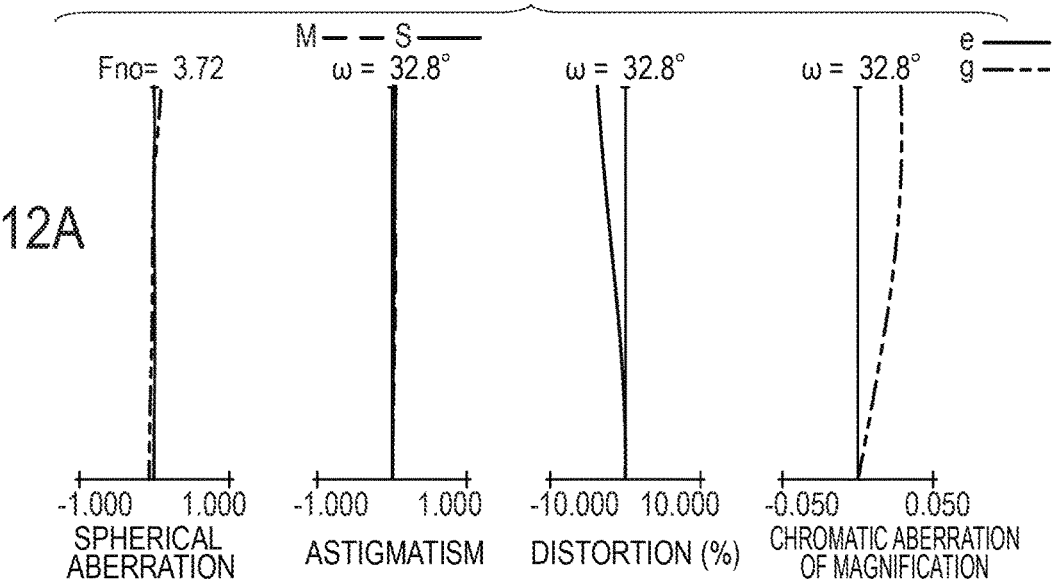
FIG. 12A shows diagrams of various aberrations in Embodiment 5 at the wide angle end when focused at an object at infinity and with the extender lens unit inserted.
Figure 12B:
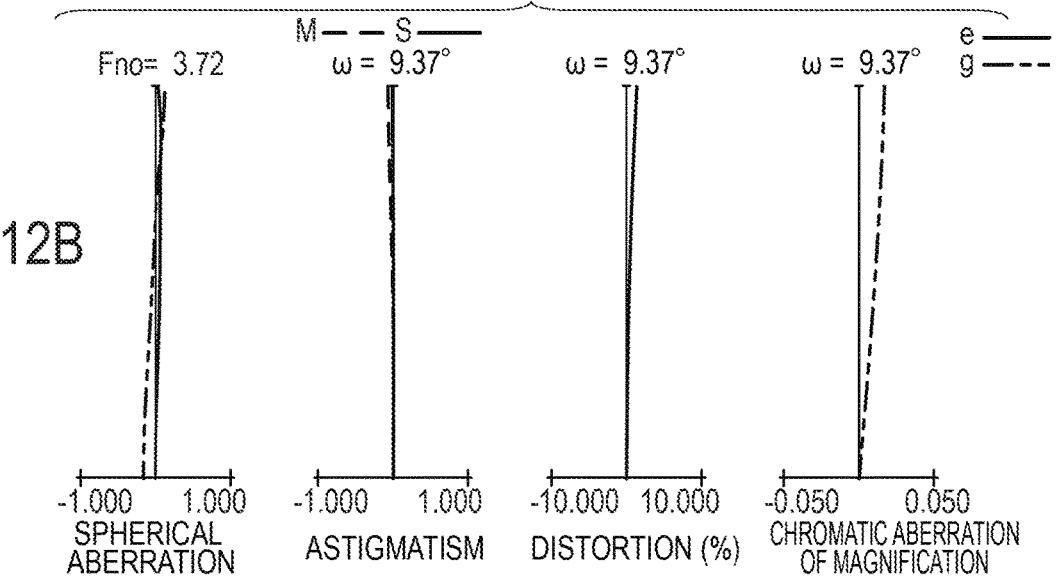
FIG. 12B shows diagrams of various aberrations in Embodiment 5 at an intermediate focal length when focused at an object at infinity and with the extender lens unit inserted.
Figure 12C:
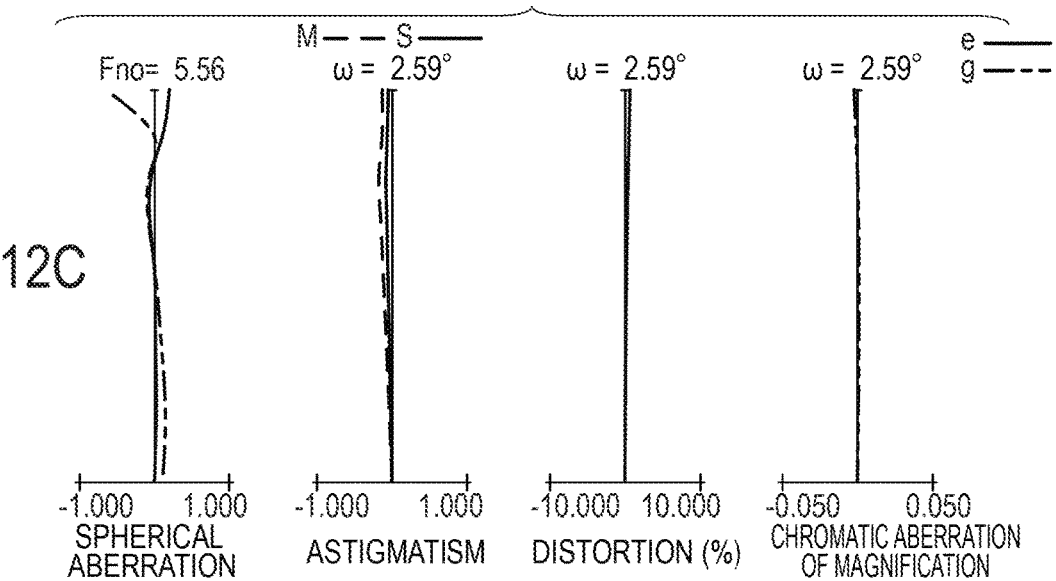
FIG. 12C shows diagrams of various aberrations in Embodiment 5 at a telephoto end when focused at an object at infinity and with the extender lens unit inserted.

FIG. 12A, FIG. 12B, and FIG. 12C are longitudinal aberration diagrams of Embodiment 5 at the wide angle end, the intermediate focal length, and the telephoto end, respectively, when focus is at an object at infinity and the extender lens unit is inserted into the optical path. As is understood from the aberration diagrams, the aberrations are satisfactorily corrected. Correspondence to the conditional expressions (1) to (6) in Numerical Embodiment 5, which corresponds to Embodiment 5 and is to be described later, is shown in Table 1. Numerical Embodiment 5 satisfies the conditional expressions (1) to (6).

As described above, with the configuration of Embodiment 5, both of the correction of the Petzval sum and the correction of the chromatic aberration of magnification can be achieved.

Embodiment 6

Figure 13:
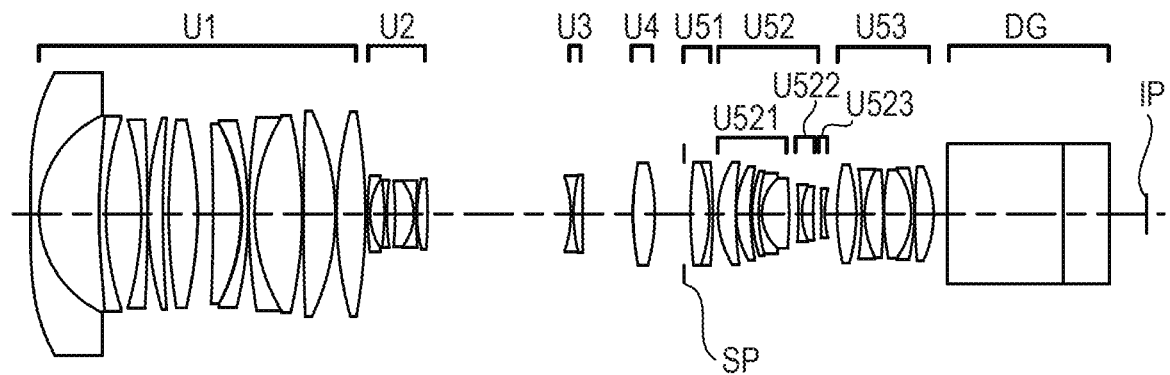
FIG. 13 is a lens cross-sectional view of a zoom lens of Embodiment 6 of the present invention when focused at an object at infinity at a wide angle end and with an extender lens unit inserted.

FIG. 13 is a lens cross-sectional view of the zoom lens of Embodiment 6 when focus is at an object at infinity at the wide angle end and the extender lens unit is inserted. The extender lens unit U52 of Embodiment 6 can be divided into the positive front unit U521, the negative middle unit U522, and the negative rear unit U523. The front unit U521 consists of a positive lens, a positive lens, and a cemented lens of three lenses of a positive lens, a negative lens, and a positive lens. The middle unit U522 consists of a cemented lens of a negative lens and a positive lens. The rear unit U523 consists of a negative lens.

Figure 14A:
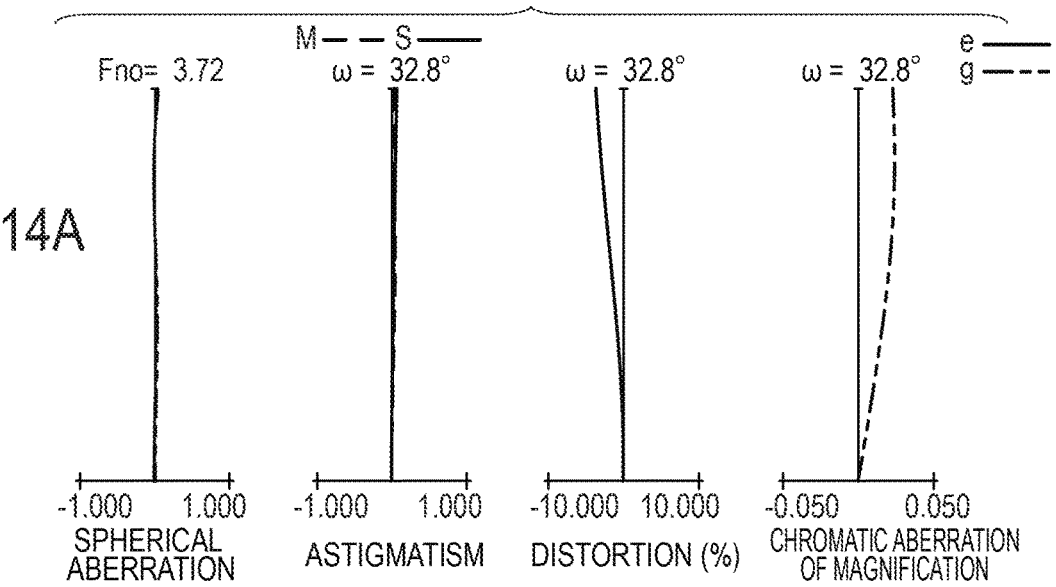
FIG. 14A shows diagrams of various aberrations in Embodiment 6 at the wide angle end when focused at an object at infinity and with the extender lens unit inserted.
Figure 14B:
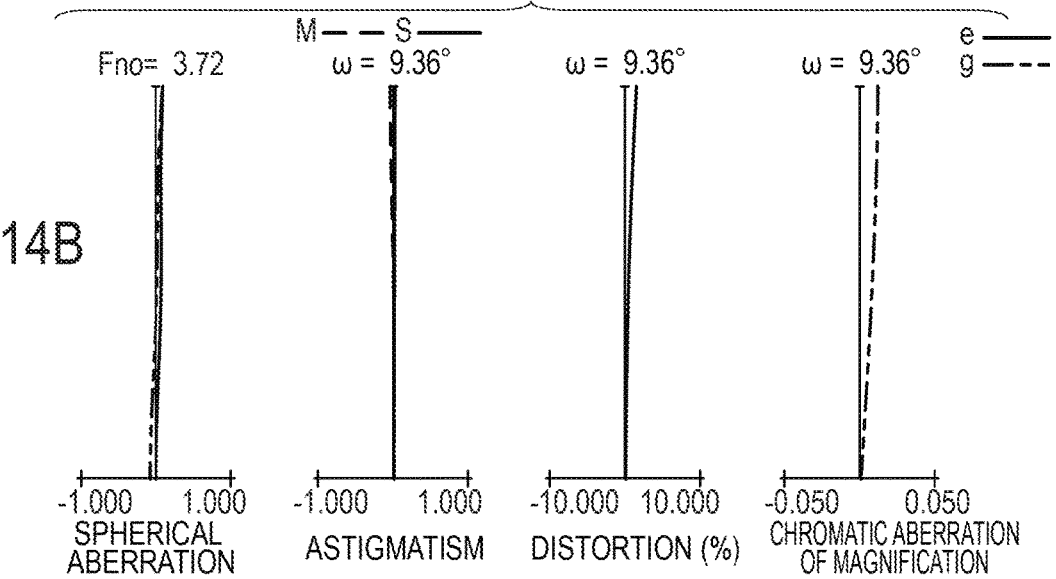
FIG. 14B shows diagrams of various aberrations in Embodiment 6 at an intermediate focal length when focused at an object at infinity and with the extender lens unit inserted.
Figure 14C:
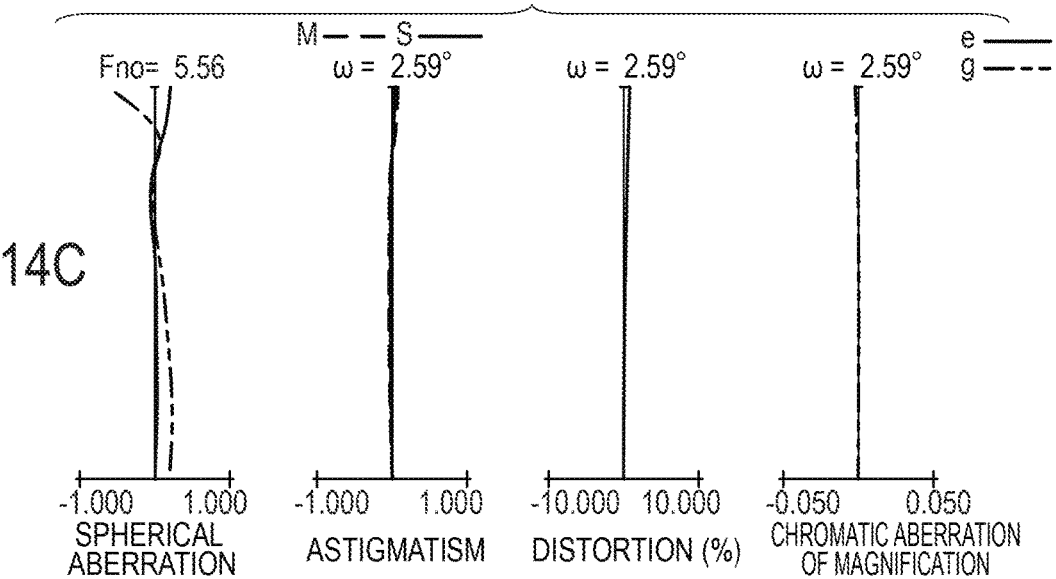
FIG. 14C shows diagrams of various aberrations in Embodiment 6 at a telephoto end when focused at an object at infinity and with the extender lens unit inserted.

FIG. 14A, FIG. 14B, and FIG. 14C are longitudinal aberration diagrams of Embodiment 6 at the wide angle end, the intermediate focal length, and the telephoto end, respectively, when focus is at an object at infinity and the extender lens unit is inserted into the optical path. As is understood from the aberration diagrams, the aberrations are satisfactorily corrected. Correspondence to the conditional expressions (1) to (6) in Numerical Embodiment 6, which corresponds to Embodiment 6 and is to be described later, is shown in Table 1. Numerical Embodiment 6 satisfies the conditional expressions (1) to (6).

As described above, with the configuration of Embodiment 6, both of the correction of the Petzval sum and the correction of the chromatic aberration of magnification can be achieved.

Embodiment 7

Figure 15:
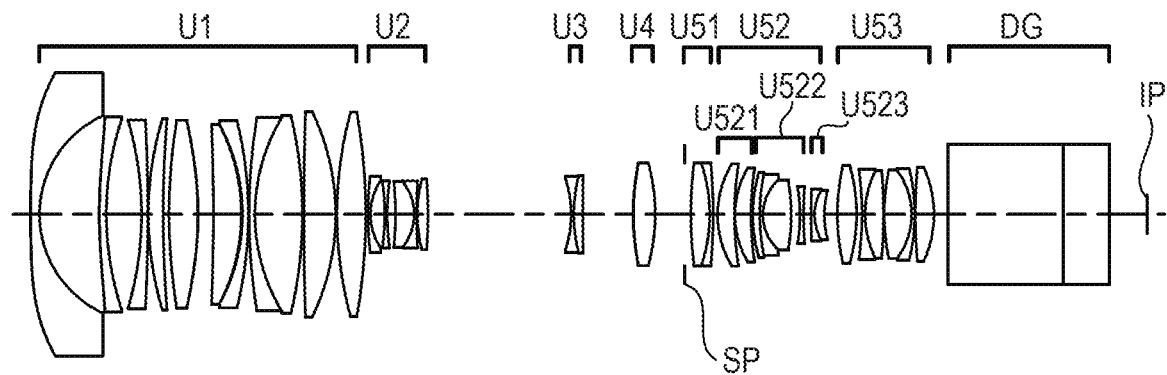
FIG. 15 is a lens cross-sectional view of a zoom lens of Embodiment 7 of the present invention when focused at an object at infinity at a wide angle end and with an extender lens unit inserted.

FIG. 15 is a lens cross-sectional view of the zoom lens of Embodiment 7 when focus is at an object at infinity at the wide angle end and the extender lens unit is inserted. The extender lens unit U52 of Embodiment 7 can be divided into the positive front unit U521, the negative middle unit U522, and the negative rear unit U523. The front unit U521 consists of a positive lens and a positive lens. The middle unit U522 consists of a cemented lens of three lenses of a positive lens, a negative lens, and a positive lens, and a negative lens. The rear unit U523 consists of a cemented lens of a negative lens and a positive lens. In the configuration of Embodiment 7, the middle unit U522 includes two negative lenses.

Figure 16A:
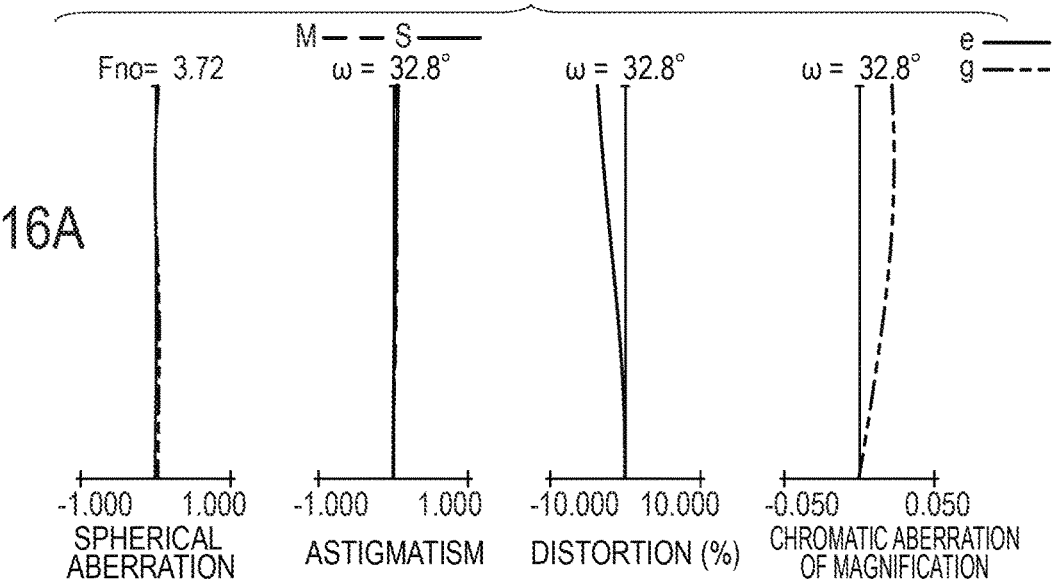
FIG. 16A shows diagrams of various aberrations in Embodiment 7 at the wide angle end when focused at an object at infinity and with the extender lens unit inserted.
Figure 16B:
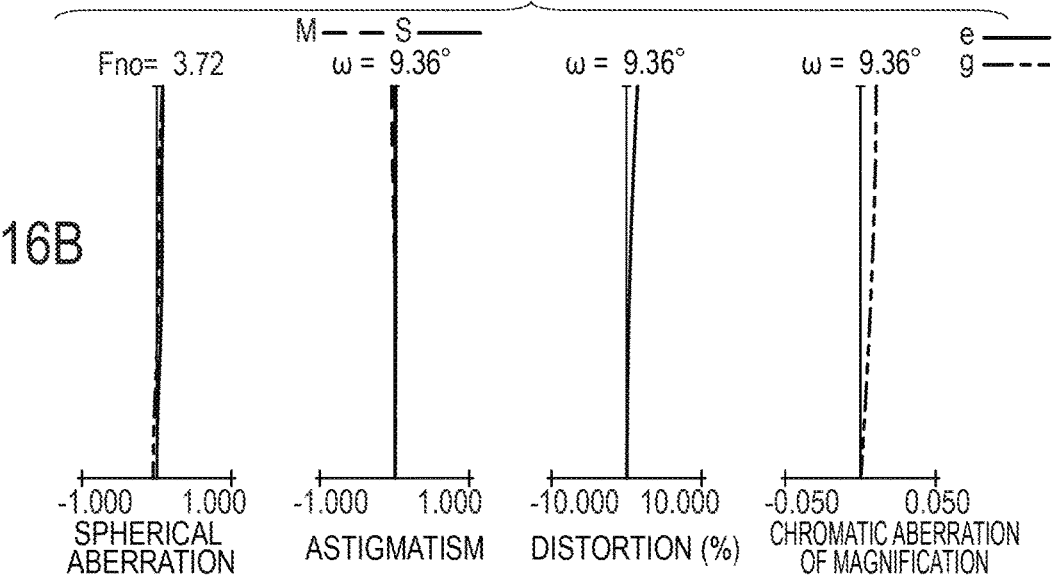
FIG. 16B shows diagrams of various aberrations in Embodiment 7 at an intermediate focal length when focused at an object at infinity and with the extender lens unit inserted.
Figure 16C:
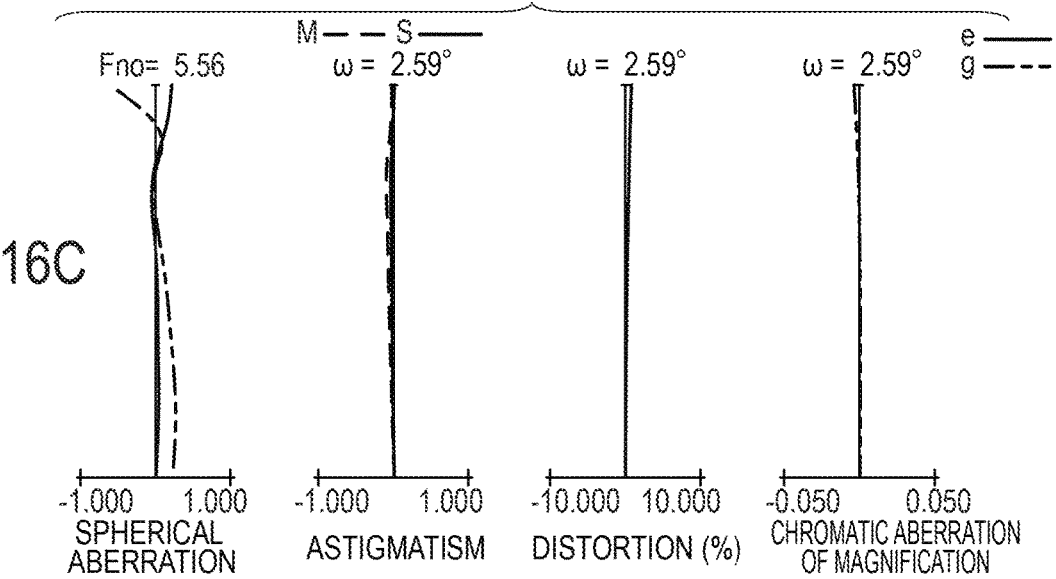
FIG. 16C shows diagrams of various aberrations in Embodiment 7 at a telephoto end when focused at an object at infinity and with the extender lens unit inserted.

FIG. 16A, FIG. 16B, and FIG. 16C are longitudinal aberration diagrams of Embodiment 7 at the wide angle end, the intermediate focal length, and the telephoto end, respectively, when focus is at an object at infinity and the extender lens unit is inserted into the optical path. As is understood from the aberration diagrams, the aberrations are satisfactorily corrected. Correspondence to the conditional expressions (1) to (6) in Numerical Embodiment 7, which corresponds to Embodiment 7 and is to be described later, is shown in Table 1. Numerical Embodiment 7 satisfies the conditional expressions (1) to (6).

As described above, with the configuration of Embodiment 7, both of the correction of the Petzval sum and the correction of the chromatic aberration of magnification can be achieved.

Figure 17:
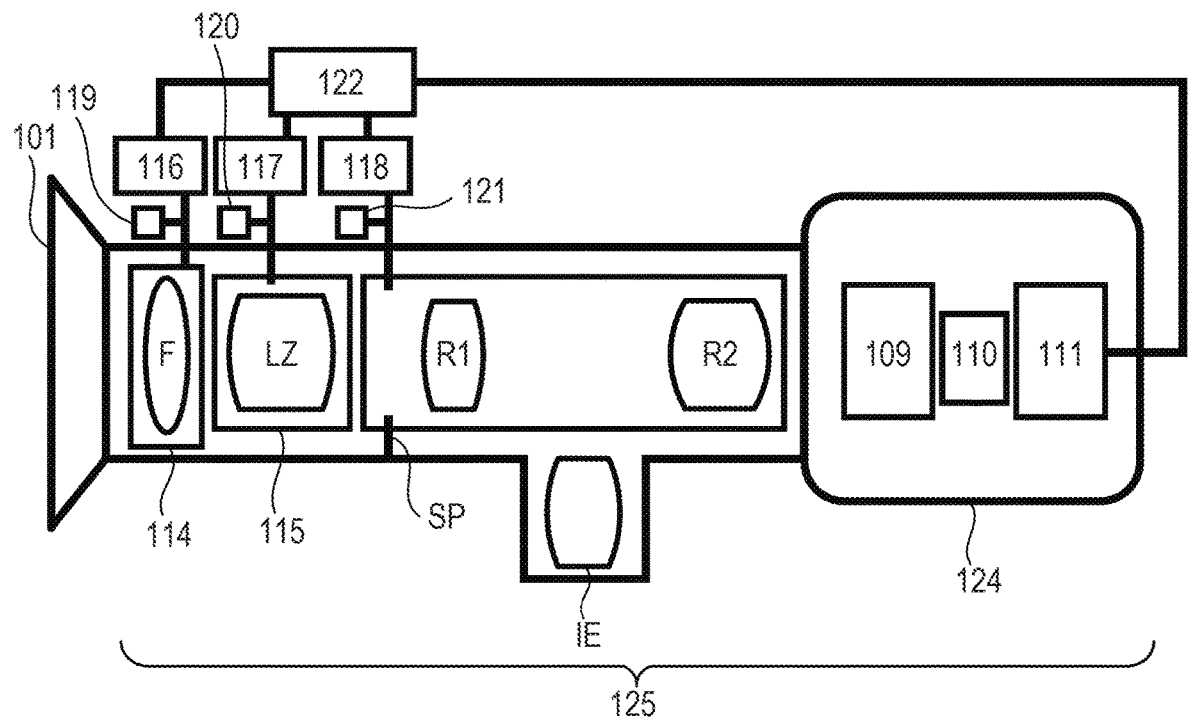
FIG. 17 is a schematic diagram of a main part of an image pickup apparatus according to at least one embodiment of the present invention.

With reference to FIG. 17, Embodiment of an image pickup apparatus (television camera system) using the zoom lens of any one of Embodiments 1 to 7 of the present invention as an image pickup optical system is described.

A zoom lens 101 that is the zoom lens according to any one of Embodiments 1 to 7 is illustrated in FIG. 17. A camera 124 is illustrated in FIG. 17. The zoom lens 101 may be detachably mounted on the camera 124, to thereby construct an image pickup apparatus 125. The zoom lens 101 includes a first lens unit F, a zoom portion LZ, and R lens units R for imaging. The first lens unit F includes a lens unit configured to move during focusing.

The zoom portion LZ includes at least two or more lens units configured to move during zooming. On the image side of the zoom portion LZ, an aperture stop SP, an R1 lens unit R1, and an R2 lens unit R2 are arranged, and the image pickup apparatus includes a lens unit IE, which can be inserted into and removed from an optical path. The lens unit IE is inserted between the R1 lens unit R1 and the R2 lens unit R2 so that the focal length range of the entire system of the zoom lens 101 is changed. Drive mechanisms 114 and 115, such as a helicoid or a cam, are configured to drive the first lens unit F and the zoom portion LZ in an optical axis direction, respectively. Motors (drive units) 116 to 118 are configured to electrically drive the drive mechanism 114, the drive mechanism 115, and the aperture stop SP, respectively.

Detectors 119 to 121, such as an encoder, a potentiometer, or a photo-sensor, are configured to detect positions of the first lens unit F and the zoom portion LZ on the optical axis, and an aperture diameter of the aperture stop SP. The camera 124 includes a glass block 109, which corresponds to an optical filter or a color separation optical system provided within the camera 124. Further, a solid-state image pickup element (photoelectric transducer) 110, such as a charge-coupled device (CCD) sensor or a complementary metal-oxide semiconductor (CMOS) sensor, is configured to receive an object image formed by the zoom lens 101. Further, central processing units (CPUs) 111 and 122 are configured to control the driving of the camera 124 and the zoom lens 101 in various manners.

Through the application of the zoom lens according to at least one embodiment of the present invention to the television camera as described above, the image pickup apparatus having the high optical performance is achieved.

The exemplary embodiments of the present invention are described above, but the present invention is not limited to those embodiments and can be modified and changed variously within the scope of the gist thereof.

Next, regarding the zoom lens according to at least one embodiment of the present invention, there are shown Numerical Embodiment at the time when the extender lens unit is retracted and Numerical Embodiments at the time when the extender lens unit is inserted, which correspond to Embodiments 1 to 7, respectively. In all Numerical Embodiments, the order of an optical surface from the object side is represented by "i".

A curvature radius of the i-th optical surface (i-th surface) from the object side is represented by "ri", and an interval between the i-th surface and the (i+1)th surface is represented by "di". Further, a refractive index and an Abbe number of a material of an optical member between the i-th surface and the (i+1)th surface with respect to a d-line are represented by "ndi" and "vdi", respectively. A back focus BF indicates an air-equivalent length of a distance from a last lens surface to a paraxial image plane excluding a filter. The asterisk "*" attached to the surface number indicates an aspherical surface.

In this case, the Abbe number of the optical material used in the appended claims and Embodiments of the present invention is as follows.

The Abbe number "vd" can be given as follows:

$$vd=(nd-1)/(nF-nC),$$

where nF, nd, and nC represent refractive indices with respect to an F-line (486.1 nm), the d-line (587.6 nm), and a C-line (656.3 nm), respectively, of the Fraunhofer lines.

Further, when an eccentricity is represented by "k", an aspherical coefficient is represented by "An", and displacement in the optical axis direction at a position of a height "h" from the optical axis with a surface vertex being a reference is represented by "x", an aspherical shape is represented as follows:

$$x=(h^2/R)/[1+\{1-(1+k)(h/R)^2\}^{1/2}]+\Sigma Anh^n,$$

provided that "n" is a natural number of 3 or more, and R represents a paraxial curvature radius.

Correspondence to the above-mentioned conditional expressions (1) to (6) in each of Numerical Embodiments 1 to 7 is shown in Table 1 below.

TABLE 1

| Conditional expression | Embodiment 1 | Embodiment 2 | Embodiment 3 | Embodiment 4 | Embodiment 5 | Embodiment 6 | Embodiment 7 |
| --- | --- | --- | --- | --- | --- | --- | --- |
| 1 | 0.302 | 0.278 | 0.278 | 0.271 | 0.311 | 0.248 | 0.234 |
| 2 | 0.633 | 0.406 | 0.377 | 0.336 | 0.237 | 0.378 | 0.311 |
| 3 | 0.84 | 2.09 | 2.46 | 2.38 | 2.54 | 1.14 | 1.28 |
| 4 | −2.13 | −2.14 | −2.14 | −2.15 | −2.13 | −2.17 | −2.15 |
| 5 | 21.27 | 19.48 | 19.48 | 17.96 | 25.87 | 19.10 | 23.95 |
| 6 | 0.939 | 0.809 | 0.812 | 0.775 | 1.037 | 0.754 | 0.860 |

<When Extender is Retracted>

| Unit: mm | | | |
| --- | --- | --- | --- |
| Surface data | | | |

| Surface number | r | d | nd | vd |
| --- | --- | --- | --- | --- |
| 1* | 1,918.222 | 2.50 | 1.83481 | 42.7 |
| 2 | 30.936 | 17.09 | | |
| 3* | 159.855 | 2.00 | 1.83481 | 42.7 |
| 4 | 86.331 | 10.04 | | |
| 5 | −94.827 | 1.80 | 1.83481 | 42.7 |
| 6 | −527.011 | 0.15 | | |
| 7 | 94.270 | 4.26 | 1.92286 | 18.9 |
| 8 | 347.768 | 1.67 | | |
| 9 | 164.790 | 8.26 | 1.60300 | 65.4 |
| 10* | −99.054 | 4.41 | | |
| 11 | −604.301 | 8.00 | 1.43387 | 95.1 |
| 12 | −55.085 | 0.30 | | |
| 13 | −53.196 | 1.70 | 1.80000 | 29.8 |
| 14 | −110.385 | 0.18 | | |
| 15 | 169.977 | 1.70 | 1.91650 | 31.6 |
| 16 | 53.615 | 13.56 | 1.43875 | 94.7 |
| 17 | −122.220 | 0.40 | | |
| 18 | 861.296 | 9.06 | 1.43387 | 95.1 |
| 19 | −67.470 | 0.40 | | |
| 20 | 111.203 | 8.23 | 1.76385 | 48.5 |
| 21 | −166.639 | (Variable) | | |
| 22 | 96.566 | 0.70 | 2.00100 | 29.1 |
| 23 | 17.507 | 4.07 | | |
| 24 | −61.457 | 0.70 | 1.43875 | 94.7 |
| 25 | 70.548 | 2.33 | | |
| 26 | −109.228 | 5.39 | 1.85478 | 24.8 |
| 27 | −14.852 | 0.70 | 1.88300 | 40.8 |

-continued

| Unit: mm | | | | |
|---|---|---|---|---|
| 28 | 171.286 | 0.21 | | |
| 29 | 40.389 | 3.04 | 1.64769 | 33.8 |
| 30 | −122.593 | (Variable) | | |
| 31 | −32.417 | 0.80 | 1.72916 | 54.7 |
| 32 | 45.308 | 2.57 | 1.84666 | 23.8 |
| 33 | 1,466.077 | (Variable) | | |
| 34* | 66.039 | 6.29 | 1.58913 | 61.1 |
| 35 | −54.493 | (Variable) | | |
| 36 (Stop) | ∞ | 1.84 | | |
| 37 | 122.970 | 5.35 | 1.51742 | 52.4 |
| 38 | −46.108 | 1.00 | 1.83481 | 42.7 |
| 39 | −164.538 | 35.50 | | |
| 40 | 61.903 | 5.47 | 1.63980 | 34.5 |
| 41 | −51.062 | 1.55 | | |
| 42 | −91.972 | 0.90 | 1.88300 | 40.8 |
| 43 | 27.882 | 5.27 | 1.48749 | 70.2 |
| 44 | −141.929 | 0.20 | | |
| 45 | 61.770 | 7.82 | 1.43875 | 94.7 |
| 46 | −21.051 | 0.90 | 2.00100 | 29.1 |
| 47 | −54.423 | 0.13 | | |
| 48 | 141.825 | 5.35 | 1.48749 | 70.2 |
| 49 | −31.912 | 4.00 | | |
| 50 | ∞ | 33.00 | 1.60859 | 46.4 |
| 51 | ∞ | 13.20 | 1.51680 | 64.2 |
| 52 | ∞ | 7.45 | | |
| Image plane | ∞ | | | |

Aspherical surface data
First surface $K = 0.00000e+000$ $A4 = 3.89922e-006$ $A6 = 1.07694e-008$ $A8 = 7.79026e-012$
$A10 = 9.49367e-014$ $A12 = 1.11174e-016$ $A14 = 1.85192e-020$ $A16 = -6.14971e-026$
$A3 = 1.60188e-005$ $A5 = -1.68458e-007$ $A7 = -3.06230e-010$
$A9 = -1.17457e-012$ $A11 = -4.11466e-015$ $A13 = -1.90016e-018$ $A15 = -7.32479e-023$
Third surface $K = 0.00000e+000$ $A4 = -2.18327e-006$ $A6 = -7.46601e-008$ $A8 = -7.11385e-010$
$A10 = -3.23420e-013$ $A12 = 1.59786e-015$ $A14 = -6.51605e-019$ $A16 = -2.04040e-022$
$A3 = -1.28010e-005$ $A5 = 4.37046e-007$ $A7 = 9.13598e-009$
$A9 = 3.03267e-011$ $A11 = -3.27268e-014$ $A13 = -1.78219e-017$ $A15 = 2.23023e-020$
Tenth surface $K = 0.00000e+000$ $A4 = 1.08070e-006$ $A6 = 1.37549e-008$ $A8 = 2.71473e-010$
$A10 = 2.08368e-013$ $A12 = -7.68841e-016$ $A14 = 1.05285e-018$ $A16 = 2.18705e-022$
$A3 = -3.60136e-006$ $A5 = -1.77292e-008$ $A7 = -2.66936e-009$ $A9 = -1.44188e-011$
$A11 = 1.68104e-014$ $A13 = -4.82004e-018$ $A15 = -2.64010e-020$
Thirty-fourth surface $K = -1.32879e+001$ $A4 = 1.73777e-006$ $A6 = -4.65336e-009$ $A8 = 2.82343e-012$

| Various data Zoom ratio 13.60 | | | |
|---|---|---|---|
| | Wide angle | Intermediate | Telephoto |
| Focal length | 4.43 | 16.45 | 60.25 |
| F-number | 1.86 | 1.86 | 2.78 |
| Half angle of view | 53.1 | 17.7 | 5.1 |
| Image height | 5.50 | 5.50 | 5.50 |
| Total lens length | 315.65 | 315.65 | 315.65 |
| BF | 40.62 | 40.62 | 40.62 |
| d21 | 0.65 | 37.09 | 52.71 |
| d30 | 40.88 | 4.91 | 4.40 |
| d33 | 14.36 | 17.47 | 2.11 |
| d35 | 8.35 | 4.77 | 5.02 |

| Zoom lens unit data | | |
|---|---|---|
| Unit | First surface | Focal length |
| 1 | 1 | 29.69 |
| 2 | 22 | −20.23 |
| 3 | 31 | −48.88 |
| 4 | 34 | 51.48 |
| 5 | 36 | 53.03 |

<When Extender is Inserted>

Numerical Embodiment 1

Unit: mm

Surface data

| Surface number | r | d | nd | vd |
|---|---|---|---|---|
| 39 | −164.538 | 1.40 | | |
| 40 | 31.869 | 6.79 | 1.49700 | 81.5 |
| 41 | −95.324 | 0.19 | | |
| 42 | 25.331 | 6.68 | 1.51633 | 64.1 |
| 43 | −70.223 | 1.00 | 1.84666 | 23.8 |
| 44 | 332.692 | 2.85 | | |
| 45 | 213.731 | 0.80 | 1.95375 | 32.3 |
| 46 | 15.756 | 3.40 | 1.54814 | 45.8 |
| 47 | 40.483 | 2.39 | | |
| 48 | 87.522 | 2.76 | 1.80810 | 22.8 |
| 49 | −22.980 | 0.80 | 1.88300 | 40.8 |
| 50 | 24.197 | 6.43 | | |

Various data
Zoom ratio 13.60

| | Wide angle | Intermediate | Telephoto |
|---|---|---|---|
| Focal length | 8.86 | 32.89 | 120.49 |
| F-number | 3.72 | 3.72 | 5.56 |
| Half angle of view | 32.8 | 9.4 | 2.6 |
| Image height | 5.50 | 5.50 | 5.50 |
| Total lens length | 315.65 | 315.65 | 315.65 |
| BF | 40.62 | 40.62 | 40.62 |

Numerical Embodiment 2

Unit: mm

Surface data

| Surface number | r | d | nd | vd |
|---|---|---|---|---|
| 39 | −164.538 | 1.40 | | |
| 40 | 30.081 | 7.02 | 1.53775 | 74.7 |
| 41 | −100.108 | 0.20 | | |
| 42 | 30.420 | 6.30 | 1.48749 | 70.2 |
| 43 | −55.400 | 0.85 | 1.84666 | 23.8 |
| 44 | 189.285 | 3.12 | | |
| 45 | 129.019 | 0.75 | 1.89190 | 37.1 |
| 46 | 16.735 | 4.00 | 1.54814 | 45.8 |
| 47 | 109.304 | 2.17 | | |
| 48 | 302.348 | 2.65 | 1.80810 | 22.8 |
| 49 | −21.039 | 0.60 | 1.88300 | 40.8 |
| 50 | 22.848 | 6.44 | | |

Various data
Zoom ratio 13.60

| | Wide angle | Intermediate | Telephoto |
|---|---|---|---|
| Focal length | 8.86 | 32.89 | 120.49 |
| F-number | 3.72 | 3.72 | 5.56 |
| Half angle of view | 32.8 | 9.4 | 2.6 |
| Image height | 5.50 | 5.50 | 5.50 |
| Total lens length | 315.65 | 315.65 | 315.65 |
| BF | 40.62 | 40.62 | 40.62 |

Numerical Embodiment 3

Unit: mm

Surface data

| Surface number | r | d | nd | vd |
|---|---|---|---|---|
| 39 | −164.538 | 1.40 | | |
| 40 | 29.474 | 7.15 | 1.53775 | 74.7 |
| 41 | −98.230 | 0.20 | | |
| 42 | 32.077 | 6.24 | 1.48749 | 70.2 |
| 43 | −51.759 | 0.85 | 1.84666 | 23.8 |
| 44 | 250.347 | 3.21 | | |
| 45 | 262.818 | 0.75 | 1.89190 | 37.1 |
| 46 | 18.544 | 3.98 | 1.54814 | 45.8 |
| 47 | 337.832 | 2.01 | | |
| 48 | 452.616 | 2.67 | 1.80810 | 22.8 |
| 49 | −20.689 | 0.60 | 1.88300 | 40.8 |
| 50 | 22.181 | 6.45 | | |

Various data
Zoom ratio 13.60

| | Wide angle | Intermediate | Telephoto |
|---|---|---|---|
| Focal length | 8.86 | 32.89 | 120.49 |
| F-number | 3.72 | 3.72 | 5.56 |
| Half angle of view | 32.8 | 9.4 | 2.6 |
| Image height | 5.50 | 5.50 | 5.50 |
| Total lens length | 315.65 | 315.65 | 315.65 |
| BF | 40.62 | 40.62 | 40.62 |

Numerical Embodiment 4

Unit: mm

Surface data

| Surface number | r | d | nd | vd |
|---|---|---|---|---|
| 39 | −164.538 | 1.40 | | |
| 40 | 29.755 | 7.02 | 1.53775 | 74.7 |
| 41 | −106.794 | 0.13 | | |
| 42 | 31.280 | 6.21 | 1.51633 | 64.1 |
| 43 | −57.352 | 0.85 | 1.84666 | 23.8 |
| 44 | 117.680 | 4.17 | | |
| 45 | 81.091 | 0.75 | 1.89190 | 37.1 |
| 46 | 14.534 | 4.36 | 1.54814 | 45.8 |
| 47 | 133.246 | 0.70 | | |
| 48 | 3,419.191 | 2.78 | 1.80810 | 22.8 |
| 49 | −19.035 | 0.65 | 1.88300 | 40.8 |
| 50 | 24.184 | 6.48 | | |

Various data
Zoom ratio 13.60

| | Wide angle | Intermediate | Telephoto |
|---|---|---|---|
| Focal length | 8.86 | 32.89 | 120.49 |
| F-number | 3.72 | 3.72 | 5.56 |
| Half angle of view | 32.8 | 9.4 | 2.6 |
| Image height | 5.50 | 5.50 | 5.50 |
| Total lens length | 315.65 | 315.65 | 315.65 |
| BF | 40.62 | 40.62 | 40.62 |

Numerical Embodiment 5

Unit: mm

Surface data

| Surface number | r | d | nd | vd |
|---|---|---|---|---|
| 39 | −164.538 | 1.40 | | |
| 40 | 28.136 | 3.26 | 1.59282 | 68.6 |
| 41 | 43.197 | 0.12 | | |
| 42 | 26.349 | 4.76 | 1.49700 | 81.5 |
| 43 | 83.715 | 0.50 | | |
| 44 | 37.613 | 3.97 | 1.75500 | 52.3 |
| 45 | 915.897 | 1.00 | 2.00100 | 29.1 |
| 46 | 169.029 | 2.55 | | |
| 47 | 116.650 | 1.00 | 2.00100 | 29.1 |
| 48 | 11.986 | 7.26 | 1.53172 | 48.8 |
| 49 | −47.038 | 2.77 | | |
| 50 | −39.578 | 1.00 | 1.91082 | 35.3 |
| 51 | 14.238 | 2.37 | 1.92286 | 18.9 |
| 52 | 41.696 | 3.53 | | |

Various data
Zoom ratio 13.60

| | Wide angle | Intermediate | Telephoto |
|---|---|---|---|
| Focal length | 8.86 | 32.89 | 120.49 |
| F-number | 3.72 | 3.72 | 5.56 |
| Half angle of view | 32.8 | 9.4 | 2.6 |
| Image height | 5.50 | 5.50 | 5.50 |
| Total lens length | 315.65 | 315.65 | 315.65 |
| BF | 40.62 | 40.62 | 40.62 |

Numerical Embodiment 6

Unit: mm

Surface data

| Surface number | r | d | nd | vd |
|---|---|---|---|---|
| 39 | −164.538 | 1.40 | | |
| 40 | 28.006 | 5.10 | 1.59282 | 68.6 |
| 41 | 109.423 | 0.12 | | |
| 42 | 27.224 | 4.08 | 1.49700 | 81.5 |
| 43 | 69.498 | 0.50 | | |
| 44 | 36.767 | 1.83 | 1.71300 | 53.9 |
| 45 | 42.378 | 0.91 | 2.00100 | 29.1 |
| 46 | 13.232 | 7.79 | 1.53172 | 48.8 |
| 47 | −106.740 | 2.66 | | |
| 48 | −110.881 | 0.99 | 2.00100 | 29.1 |
| 49 | 18.796 | 3.18 | 1.92286 | 18.9 |
| 50 | 89.210 | 2.35 | | |
| 51 | −550.302 | 1.00 | 1.69680 | 55.5 |
| 52 | 27.097 | 3.58 | | |

Various data
Zoom ratio 13.60

| | Wide angle | Intermediate | Telephoto |
|---|---|---|---|
| Focal length | 8.86 | 32.89 | 120.49 |
| F-number | 3.72 | 3.72 | 5.56 |
| Half angle of view | 32.8 | 9.4 | 2.6 |
| Image height | 5.50 | 5.50 | 5.50 |
| Total lens length | 315.65 | 315.65 | 315.65 |
| BF | 40.62 | 40.62 | 40.62 |

Numerical Embodiment 7

Unit: mm

Surface data

| Surface number | r | d | nd | vd |
|---|---|---|---|---|
| 39 | −164.538 | 1.40 | | |
| 40 | 28.306 | 4.82 | 1.59282 | 68.6 |
| 41 | 93.025 | 0.12 | | |
| 42 | 26.266 | 4.62 | 1.49700 | 81.5 |
| 43 | 89.999 | 0.50 | | |
| 44 | 43.681 | 1.99 | 1.74100 | 52.6 |
| 45 | 57.983 | 0.91 | 2.00100 | 29.1 |
| 46 | 13.518 | 8.07 | 1.54814 | 45.8 |
| 47 | −57.692 | 2.52 | | |
| 48 | −47.921 | 1.00 | 1.72916 | 54.7 |
| 49 | 106.452 | 2.18 | | |
| 50 | 372.780 | 0.99 | 1.95375 | 32.3 |
| 51 | 14.036 | 2.83 | 1.92286 | 18.9 |
| 52 | 29.049 | 3.54 | | |

Various data
Zoom ratio 13.60

| | Wide angle | Intermediate | Telephoto |
|---|---|---|---|
| Focal length | 8.86 | 32.89 | 120.49 |
| F-number | 3.72 | 3.72 | 5.56 |
| Half angle of view | 32.8 | 9.4 | 2.6 |
| Image height | 5.50 | 5.50 | 5.50 |
| Total lens length | 315.65 | 315.65 | 315.65 |
| BF | 40.62 | 40.62 | 40.62 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-150313, filed Aug. 20, 2019, which is hereby incorporated by reference herein in its entirety.

What is claimed is:

1. An extender lens unit insertable into and removable from an optical path in a relay lens unit included in a zoom lens, the extender lens unit consisting of:
   a front unit having a positive refractive power;
   a middle unit having a negative refractive power; and
   a rear unit having a negative refractive power,
   wherein the front unit, the middle unit, and the rear unit comprise seven or more lenses,
   wherein the front unit, the middle unit, and the rear unit include positive lenses and three negative lenses among the seven or more lenses,
   wherein the middle unit includes one negative lens, among the three negative lenses,
   wherein the front unit includes one of the positive lenses arranged closest to an object side, and
   wherein the following conditional expressions are satisfied:

$$0.20 < Nn - Np < 0.60;\text{ and}$$

$$0.20 < fbna/fb < 1.00,$$

$$2.38 \leq fb/fc < 8.00;\text{ and}$$

$$10.0 < vdp - vdn < 40.0,$$

where Np and Nn represent an average refractive index of the positive lenses and an average refractive index of the three negative lenses, respectively, fbna represents a focal length of the one negative lens included in the middle unit, fb represents a focal length of the middle unit, fc represents a focal length of the rear unit, and vdp and vdn represent an average Abbe number of the positive lenses and an average Abbe number of the three negative lenses, respectively.

2. The extender lens unit according to claim 1, wherein the following conditional expression is satisfied:

$$-2.50<fa/fbc<-1.50 \quad (4)$$

where fa represents a focal length of the front unit, and fbc represents a combined focal length of the middle unit and the rear unit.

3. The extender lens unit according to claim 1, wherein the following conditional expression is satisfied:

$$0.50<TDext/fa<1.50,$$

where fa represents a focal length of the front unit, and TDext represents a distance on an optical axis from a surface of the front unit closest to the object side to a surface of the rear unit closest to an image side.

4. The extender lens unit according to claim 1, wherein the front unit, the middle unit, and the rear unit comprise two or more cemented lenses among the seven or more lenses.

5. The extender lens unit according to claim 1, wherein the front unit, the middle unit, and the rear unit comprise three or more cemented lens surfaces among the seven or more lenses.

6. The extender lens unit according to claim 1, wherein the front unit, the middle unit, and the rear unit consist of eight or less lenses.

7. The extender lens unit according to claim 1, wherein each of the front unit, the middle unit, and the rear unit includes a negative lens, among the three negative lenses.

8. The extender lens unit according to claim 1, wherein:
the middle unit includes two negative lenses, among the three negative lenses, and
the rear unit includes a negative lens, among the three negative lenses.

9. A zoom lens comprising in order from an object side to an image side:
a zoom lens unit configured to move along an optical axis during zooming; and
a relay lens unit configured not to move along the optical axis during zooming,
wherein the relay lens unit includes an extender lens unit, which is insertable into and removable from an optical path in the relay lens unit,
wherein the extender lens unit consists of:
a front unit having a positive refractive power;
a middle unit having a negative refractive power; and
a rear unit having a negative refractive power,
wherein the front unit, the middle unit, and the rear unit comprise seven or more lenses,
wherein the front unit, the middle unit, and the rear unit include positive lenses and three negative lenses among the seven or more lenses,
wherein the middle unit includes one negative lens, among the three negative lenses,
wherein the front unit includes one of the positive lenses arranged closest to an object side, and wherein the following conditional expressions are satisfied:

$$0.20<Nn-Np<0.60; \text{ and}$$

$$0.20<fbna/fb<1.00,$$

$$2.38 \leq fb/fc<8.00; \text{ and}$$

$$10.0<vdp-vdn<40.0,$$

where Np and Nn represent an average refractive index of the positive lenses and an average refractive index of the three negative lenses, respectively, fbna represents a focal length of the one negative lens included in the middle unit, fb represents a focal length of the middle unit, fc represents a focal length of the rear unit, and vdp and vdn represent an average Abbe number of the positive lenses and an average Abbe number of the three negative lenses, respectively.

10. The zoom lens according to claim 9, further comprising:
a first lens unit having a positive refractive power and configured not to move for zooming disposed on the object side of the zoom lens unit,
wherein the zoom lens unit includes:
a second lens unit having a negative refractive power and configured to move along the optical axis during zooming; and
a third lens unit configured to move along the optical axis during zooming.

11. An image pickup apparatus comprising:
a zoom lens; and
an image pickup element configured to receive light of an image formed by the zoom lens,
wherein the zoom lens comprises, in order from an object side to an image side:
a zoom lens unit configured to move along an optical axis during zooming; and
a relay lens unit configured not to move along the optical axis during zooming,
wherein the relay lens unit includes an extender lens unit, which is insertable into and removable from an optical path in the relay lens unit,
wherein the extender lens unit consists of:
a front unit having a positive refractive power;
a middle unit having a negative refractive power; and
a rear unit having a negative refractive power,
wherein the front unit, the middle unit, and the rear unit comprise seven or more lenses,
wherein the front unit, the middle unit, and the rear unit include positive lenses and three negative lenses among the seven or more lenses,
wherein the middle unit includes one negative lens, among the three negative lenses,
wherein the front unit includes one of the positive lenses arranged closest to an object side, and
wherein the following conditional expressions are satisfied:

$$0.20<Nn-Np<0.60; \text{ and}$$

$$0.20<fbna/fb<1.00,$$

$$2.38 \leq fb/fc<8.00; \text{ and}$$

$$10.0<vdp-vdn<40.0,$$

where Np and Nn represent an average refractive index of the positive lenses and an average refractive index of the three negative lenses, respectively, fbna represents a focal length of the one negative lens included in the middle unit, fb represents a focal length of the middle unit, fc represents a focal length of the rear unit, and vdp and vdn represent an average Abbe number of the positive lenses and an average Abbe number of the three negative lenses, respectively.

* * * * *